(12) United States Patent
Colagrosso et al.

(10) Patent No.: US 11,372,522 B2
(45) Date of Patent: Jun. 28, 2022

(54) INTELLIGENT PEOPLE-CENTRIC PREDICTIONS IN A COLLABORATIVE ENVIRONMENT

(71) Applicant: Google LLC, Mountain View, CA (US)

(72) Inventors: Michael Colagrosso, Boulder, CO (US); Michael Procopio, Arvada, CO (US)

(73) Assignee: Google LLC, Mountain View, CA (US)

( * ) Notice: Subject to any disclaimer, the term of this patent is extended or adjusted under 35 U.S.C. 154(b) by 369 days.

(21) Appl. No.: 15/841,185

(22) Filed: Dec. 13, 2017

(65) Prior Publication Data
US 2019/0179494 A1 Jun. 13, 2019

(51) Int. Cl.
| | |
|---|---|
| G06F 3/0482 | (2013.01) |
| G06Q 10/10 | (2012.01) |
| G06Q 10/06 | (2012.01) |
| G06N 5/02 | (2006.01) |
| G06N 20/00 | (2019.01) |
| G06F 16/93 | (2019.01) |
| G06F 16/176 | (2019.01) |
| G06F 40/166 | (2020.01) |

(52) U.S. Cl.
CPC .......... *G06F 3/0482* (2013.01); *G06F 16/176* (2019.01); *G06F 16/93* (2019.01); *G06F 40/166* (2020.01); *G06N 5/022* (2013.01); *G06N 20/00* (2019.01); *G06Q 10/06* (2013.01); *G06Q 10/101* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,539,027 | B1 * | 9/2013 | Chen | G06Q 50/01 709/204 |
| 9,461,972 | B1 * | 10/2016 | Mehta | H04L 63/10 |
| 2013/0067355 | A1 * | 3/2013 | Hewitt | H04L 51/36 715/752 |

(Continued)

OTHER PUBLICATIONS

Zhang Q, Yu H (2014) Computational Approaches for Predicting Biomedical Research Collaborations. PLoS One 9(11): e111795. doi:10.1371/journal.pone.0111795; downloaded from www.plosone.org May 12, 2020 (Year: 2014).*

(Continued)

*Primary Examiner* — Christopher J Fibbi
(74) *Attorney, Agent, or Firm* — Lowenstein Sandler LLP

(57) ABSTRACT

A method for predicting one or more collaborators provided by a cloud-based content management platform includes identifying, for a user of a cloud-based content management platform, a plurality of other users of the cloud-based content management platform that have a relationship with the user and are associated with a plurality of documents hosted by the cloud-based content management platform, predicting one or more collaborators for the user based on collaboration attributes of the plurality of other users, and providing for presentation to the user, information identifying the one or more collaborators to direct the user to a subset of documents from the plurality of documents hosted by the cloud-based content management platform, the subset of documents each being associated with one of the predicted one or more collaborators.

20 Claims, 14 Drawing Sheets

(56) References Cited

U.S. PATENT DOCUMENTS

| | | | | |
|---|---|---|---|---|
| 2013/0159408 | A1* | 6/2013 | Winn | G06N 20/00 709/204 |
| 2014/0101251 | A1* | 4/2014 | Savage | H04L 12/1822 709/204 |
| 2014/0358826 | A1* | 12/2014 | Traupman | G06Q 50/01 706/11 |
| 2016/0328416 | A1* | 11/2016 | Rose | H04L 63/08 |
| 2016/0379129 | A1* | 12/2016 | Assem Aly Salama | G06Q 30/0282 706/52 |
| 2017/0031575 | A1* | 2/2017 | Dotan-Cohen | G06F 3/038 |
| 2017/0052955 | A1 | 2/2017 | Nandy et al. | |
| 2017/0147796 | A1 | 5/2017 | Sardesai et al. | |
| 2017/0372252 | A1* | 12/2017 | Arora | G06Q 10/063112 |
| 2018/0025084 | A1* | 1/2018 | Conlan | G06F 16/955 707/734 |
| 2018/0115603 | A1* | 4/2018 | Hu | G06F 16/24578 |
| 2018/0174070 | A1* | 6/2018 | Hoffman | G06Q 30/0255 |
| 2018/0232346 | A1* | 8/2018 | Konnola | G06F 40/166 |
| 2019/0114528 | A1* | 4/2019 | Xiong | G06N 3/04 |
| 2019/0140995 | A1* | 5/2019 | Roller | G06F 40/30 |
| 2019/0332938 | A1* | 10/2019 | Gendron-Bellemare | G06N 3/0445 |
| 2019/0394257 | A1* | 12/2019 | Estes | H04L 67/306 |
| 2019/0394270 | A1* | 12/2019 | Larabie-Belanger | G06Q 10/063114 |

OTHER PUBLICATIONS

Li et al. (2007). "Predicting individual priorities of shared activities using support vector machines". Proc. The sixteenth ACM Conference on Conference on Information and Knowledge Management (CIKM '07). ACM. New York (2007), 515-524. 10 pages.

International Search Report and Written Opinion for Application No. PCT/US2018/051224, dated Feb. 4, 2019, 13 pages.

* cited by examiner

US 11,372,522 B2

INTELLIGENT PEOPLE-CENTRIC PREDICTIONS IN A COLLABORATIVE ENVIRONMENT

BACKGROUND

During online collaboration, users utilize various collaborative tools provided by a cloud-based content management platform over a network to work together. The collaborative tools include document applications (e.g., word processor, presentation, and spreadsheet applications), a cloud-based document storage service, an online calendar service, an email service, and a messenger. The collaborative tools allow users to share, edit, and comment on documents over the network, schedule project timelines, communicate over emails or messengers, etc. With conventional collaborative tools, when users have a large number of shared documents and a large number of possible collaborators, each user may spend a significant amount of time in identifying possible collaborators and documents to interact with. This involves, for example, frequent user interaction with collaborative applications and browsing through a large volumes of data, which are for example shared documents, in the cloud-based content management platform.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for predicting a collaborator that a user will likely collaborate with, based on collaboration attributes of potential collaborators. In an implementation, potential collaborators are identified from users of a cloud-based content management platform that have a relationship with the user and are associated with documents hosted by the cloud-based content management platform. The collaboration attributes of each potential collaborator are extracted from records of past collaboration with the user. Information identifying the predicted collaborators may be provided to the user to direct the user to documents associated with each predicted collaborator.

In some other implementations, a system and method are disclosed for predicting a response the user will likely provide responsive to pending actions by another user. The pending actions call for the user's attention in association with documents hosted by the cloud-based content management platform. The predicted response to one of the pending actions may be facilitated by providing a user interface (UI) component to be activated by the user. The UI component, upon activation, would direct the user to a respective pending action within a relevant document.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
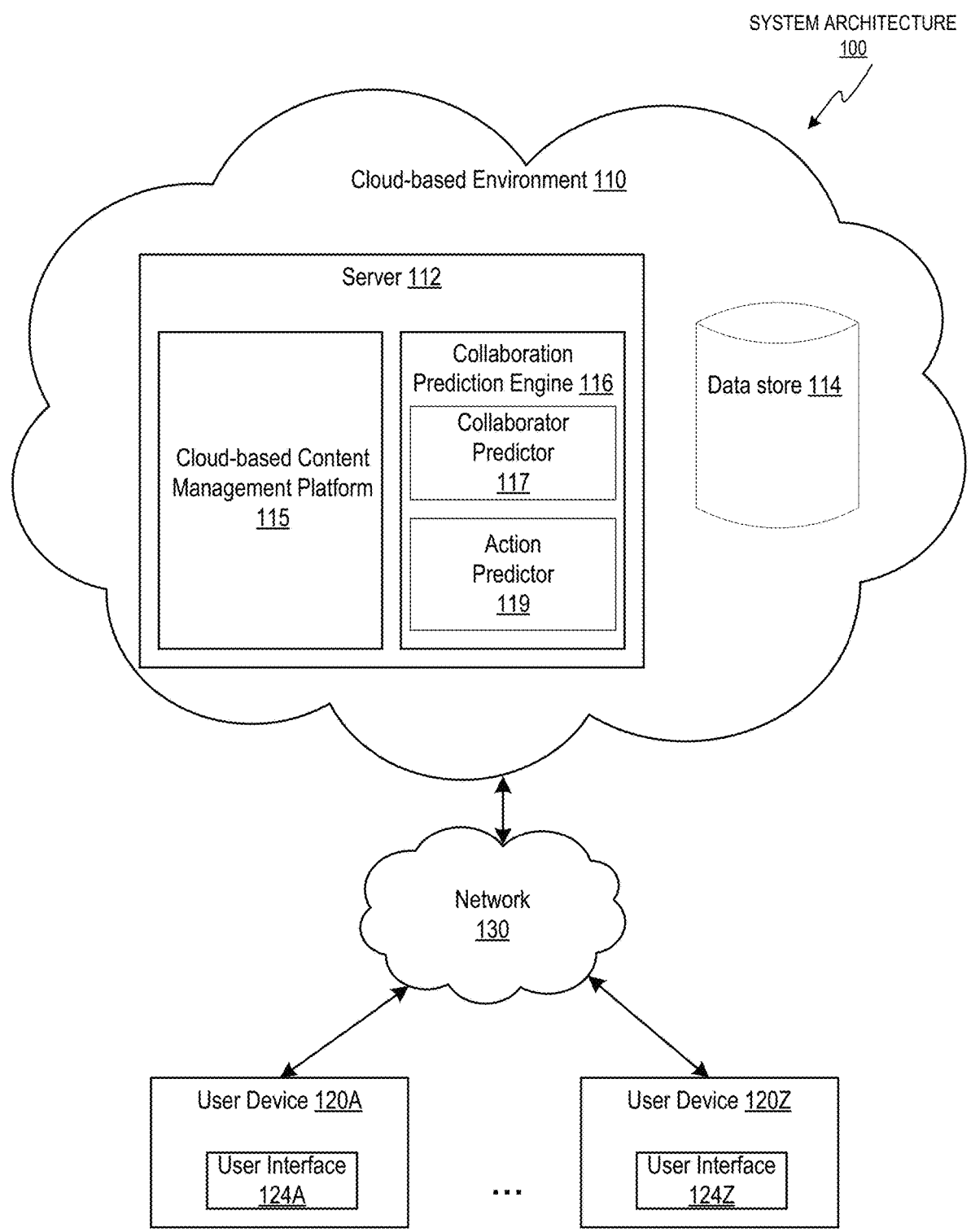
FIG. 1 illustrates an example of a system architecture for implementations of the present disclosure.

A cloud-based content management platform may provide collaborative tools such as document applications (e.g., word processor, presentation, and spreadsheet applications), a cloud-based document storage service, an online calendar, an email service, a messenger, etc. As used herein, online collaboration (also referred to herein as "a collaboration" or "a collaborative event") represents actions of multiple users with respect to a document stored in a cloud-based data storage system. These actions may include, for example, reviewing, sharing, editing, or commenting on a document. An action can result in a notification to (or invitation for a response from) another user. Such an action is referred to herein as a "pending action." In particular, a pending action can be an action of a user that is directed to another user calling for attention or response with regards to a particular document, although the other user may ignore the action. For example, a user may share a document with another user, and in response to the pending sharing action, the other user may open and view the document, or edit the document. In another example, a user may edit a document, and in response to the pending editing action, the other user may respond by further editing the document, accepting the suggested edit, or commenting on the edit. In yet another example, a user may comment on a document, and in response to the pending commenting action, another user may reply to the comment or resolve the comment to close a comment thread. In still another example, a user may schedule a calendar event to collaboratively edit a document with another user, and the other user may need to review the document to prepare to the pending calendar event.

The cloud-based data storage system may store numerous documents having various pending actions to which a user is invited to respond. Some of these documents may be important to the user in view of their content and/or a person who performed a respective pending action. However, to locate documents associated with pending actions to which the user may want to respond, the user may need to spend a significant amount of time searching through and reviewing the documents with pending actions addressed to the user. Such searching and reviewing may unduly delay collaboration, may be disruptive to the user experience and may result in an inefficient use of computing resources.

Aspects and implementations of the present disclosure address the above deficiencies, among others, by predicting (among many people who performed pending actions directed to the user) a collaborator with whom a user may be interested to collaborate, and by leading the user to documents associated with the predicted collaborator. The predicted collaborator may be selected from other users (i.e., potential collaborators) of the cloud-based content management platform who have collaborated with the user in the past. The potential collaborators may be identified based on information extracted from various sources (e.g., document applications (e.g., word processor, presentation, and spreadsheet applications), a cloud-based document storage service, an online calendar service, an email service, a messenger, etc.). The collaboration prediction technique of the present disclosure may be carried out using a machine learning model or a heuristics approach, among other things. The prediction technique may predict a collaboration based on attributes of past collaboration of a potential collaborator with the user. In implementations, after a collaborator is predicted, information about identity of the predicted collaborator may be presented to the user in order to direct the user to documents associated with the collaborator to advance collaboration. In some implementations, the user may be provided with a link to a document search result for documents associated with the predicted collaborator. The prediction of potential collaborators and the related presentation prompts users to a selection, based on the prediction, of collaborators, related shared documents and pending actions from a large number of overall potential collaborators, shared documents, and pending actions accessible to the user that leads to reduced user input when identifying collaborators, associated documents, and actions to interact with. In addition or alternatively, the prediction enables the user to interact in a more focused manner with the cloud-based content management platform, such that browsing through and viewing of documents and pending actions that are not of interest to the user is reduced or eliminated, such user selection is directed mostly to documents of interest. As a consequence, computing resources and network bandwidth required by unnecessary transfer of documents inside the cloud-based collaboration platform and downloads from server to client are reduced or eliminated.

In addition or alternatively, some implementations of the present disclosure predict which pending action (from many pending actions directed to the user) the user is likely to respond (and/or the type of response that the user is likely to provide) and by directing the user to a UI element that the user can select to respond. The response prediction technique of the present disclosure may predict a response based on attributes of the pending actions. The response prediction technique may further consider the user's response history specific to a type of pending action and/or specific to a particular user. The response prediction technique may be implemented using a machine learning model or a heuristics approach, among other things. After it is predicted that the user is likely to respond to a pending action, the user may be provided with a user interface (UI) component, such as a link, to enable the user to provide a response to the pending action. The link may take the user to a relevant document or to a pending action specified within a document.

Accordingly, aspects of the present disclosure provide a user with a quick access to documents of other users with whom the user is likely to collaborate. In addition or alternatively, aspects of the present disclosure predict which pending action of a collaborator with respect to a document the user is likely to respond to and/or the type of response. As a result, the need for time-consuming user searching and reviewing of numerous documents with pending actions addressed to the user is eliminated. As such, the reliability of cloud-based content management platform s is increased, and user collaboration is expedited. In addition, by eliminating time-consuming user searching and reviewing of numerous documents, the use of processing resources is improved, and memory consumption is reduced.

In addition, some benefits of the present disclosure may provide a technical effect caused by and/or resulting from a technical solution to a technical problem. For example, one technical problem may relate to significant use of network bandwidth and processing resources in the cloud-based collaborative environment when locating and loading documents for each pending action and/or for each user to enable each user to review the documents and the pending actions to respond. Such locating and loading of documents for each pending action and/or for each user in conventional collaborative environment may include many documents that the user has no interest in, resulting in wasteful use of resources. One of the technical solutions to the technical problem may include providing, for presentation to the user, information identifying predicted collaborators to direct each user to a smaller set of documents and by providing a user interface (UI) for presentation to each user to enable a user to provide predicted responses to a smaller set of pending actions of other users. That is, the technology allows the cloud-based collaboration platform to locate and load only a small number of documents, (i.e. a subset of documents for a few specific collaborators that are specified by the prediction, e.g. each document being associated with one of the predicted one or more collaborators; i.e. a subset of documents for a few specific pending actions). As a consequence, computing resources and network bandwidth required by unnecessary transfer of documents inside the cloud-based collaboration platform and downloads from server to client are reduced or eliminated.

FIG. 1 illustrates an example of a system architecture 100 for implementations of the present disclosure. The system architecture 100 includes a cloud-based environment 110 connected to user devices 120A-120Z via a network 130. The cloud-based environment 110 refers to a collection of physical machines that host applications providing one or more services (e.g., content management, word processing, collaborative document hosting, etc.) to multiple user devices 120 via a network 130. The network 130 may be public networks (e.g., the Internet), private networks (e.g., a local area network (LAN) or wide area network (WAN)), or a combination thereof. The network 130 may include a wireless infrastructure, which may be provided by one or more wireless communications systems, such as a wireless fidelity (WiFi) hotspot connected with the network 130 and/or a wireless carrier system that can be implemented using various data processing equipment, communication towers, etc. Additionally or alternatively, the network 130 may include a wired infrastructure (e.g., Ethernet).

The cloud-based environment 110 may include a server 112 and a data store 114. The data store 114 may be separate from the server 112 and communicatively coupled to the server 112, or the data store 114 may be part of the server 112. In some embodiments, the data store 114 may reside on the user devices 120A-120Z. Alternatively, the data store 114 may be a distributed data store including multiple repositories, databases, etc. and may store data of various collaboration tools including document applications (e.g., word processor, presentation, and spreadsheet applications), a cloud-based document storage service, an online calendar service, an email service, a messenger, etc. The data in the data store 114 may include a variety type of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents may be shared with users and/or concurrently editable by users. The data store 114 may also store one or more comments created in the documents. The data store 114 may also store email messages, text messages, calendar invitations, etc.

The server 112 may be represented by one or more physical machines (e.g., server machines, desktop computers, etc.) that include one or more processing devices communicatively coupled to memory devices and input/output (I/O) devices. The server 112 may host a cloud-based content management platform 115. The cloud-based content management platform 115 may be implemented as computer instructions that are executable by one or more processing devices on the server 112. In alternative implementations, the cloud-based content management platform 115 may be installed on the user devices 120A-120Z (e.g., as a stand-alone application) and operate as peers in a peer-to-peer environment. In yet alternative implementations, applications on the user devices 120A-120Z may interact with the cloud-based content management platform 115 and may perform some of the functionality of the content management platform 115.

The cloud-based content management platform 115 may enable a user to store various documents in the data store 114, and perform collaborative actions with respect to these documents. Additionally, in some embodiments, the cloud-based content management platform 115 may provide a UI 124A-124Z that enables the user to perform collaborative actions to respective documents and view pending actions directed to the user by other users in the respective UI 124A-124Z.

In an implementation, the UIs 124A-124Z of the cloud-based content management platform 115 may be web pages rendered by a web browser and displayed on the user device 120A-120Z in a web browser window. In another implementation, the UIs 124A-124Z may be displayed by a mobile application or a desktop application. For example, the UIs 124A-124Z may be displayed by a native application executing on the operating system of the user device 120A-120Z. The native application may be separate from a web browser.

The server 112 includes a collaboration prediction engine 116 to advance collaboration. The collaboration prediction engine 116 has a collaborator predictor 117 and an action predictor 119. In implementations, the collaborator predictor 117 identifies one or more other users of the cloud-based content management platform 115 based on actions and affiliations of the user in association with the cloud-based content management platform 115. These users may be referred to as potential collaborators, herein. The collaborator predictor 117 predicts one or more collaborators the user will likely to collaborate with, possibly in a near future, based on collaboration attributes of each potential collaborator. The collaborator predictor 117 may provide information identifying the predicted collaborators to direct the user to documents associated with the predicted collaborators. In some other implementations, the collaborator predictor 117 may predict a team, instead of individuals the user will likely collaborate with.

In implementations, the action predictor 119 identifies pending actions directed to the user for a response by another user in association with documents. The action predictor 119 predicts one or more responses of the user based on action attributes of each pending action by another user. After the prediction, the action predictor 119 provides one or more UI components to be activated by the user to perform the predicted responses for respective pending actions.

The user devices 120A-120Z may include one or more processing devices communicatively coupled to memory devices and I/O devices. The user devices 120A-120Z may be desktop computers, laptop computers, tablet computers, mobile phones (e.g., smartphones), or any suitable computing device. As discussed above, the user devices 120A-120Z may each include a web browser and/or a client application (e.g., a mobile application or a desktop application.) A user may access or review a document via the web browser or the client application. For example, the user may select and edit a document from the UI 124A provided by the cloud-based content management platform 115 and presented by the web browser or the client application. As such, the user device 120A associated with the user may request the document from the cloud-based environment 110 and review, edit or comment on the document.

Figure 2:
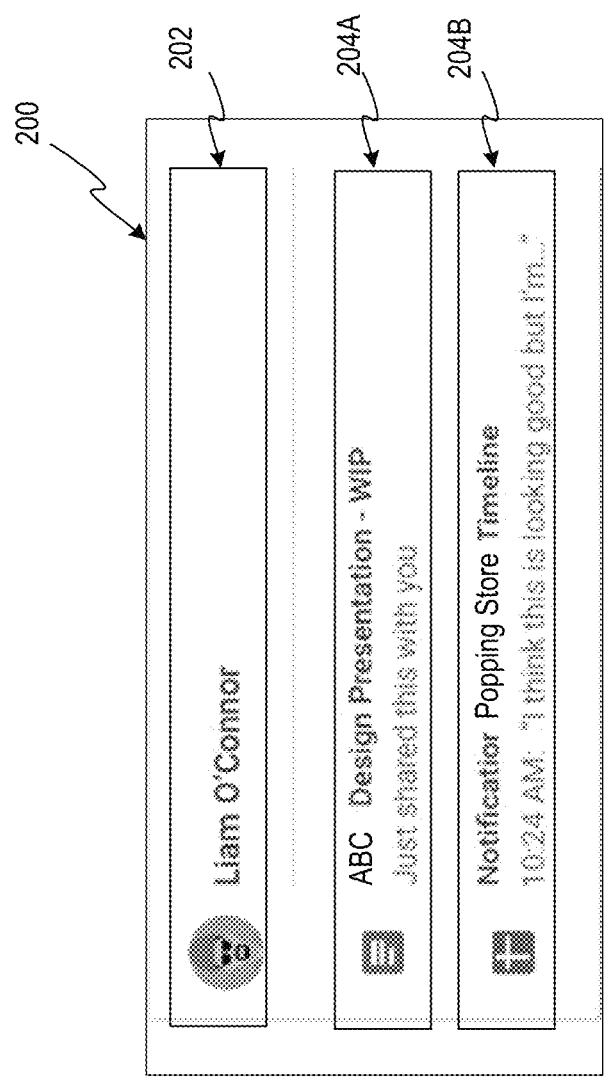
FIG. 2 illustrates an example user interface identifying a predicted collaborator for a user and documents with pending actions involving the user to facilitate collaboration on the cloud-based content management platform.

FIG. 2 illustrates an example predicted collaboration UI 200 to advance collaboration on the cloud-based content management platform. In some implementations, the predicted collaboration UI 200 has a predicted collaborator UI component 202 and a predicted response UI components 204A and 204B. In another implementation, the predicted collaboration UI 200 may include only the predicted collaborator UI component 202 or the predicted response UI components 204A and 204B. In some implementations, the predicted collaborator UI component 202 may display an identity of a predicted collaborator (e.g. "Liam O'Connor".) For example, the identity may be in a form of a name, a nickname, a profile identifier, a photo, or the like. The predicted collaborator UI component 202 may further include a link to lead the user to documents associated with the predicted collaborator. The link may direct the user to a search result of documents where the predictor collaborator is an owner, editor, or viewer of the documents. Thus, when the user clicks on the predicted collaborator UI component 202, the server 112 may provide a list of documents that "Liam O'Connor" is involved in as an owner, an editor, or a viewer.

In one implementation, the predicted response UI components 204A and 204B may include a link to lead the user to perform a respective predicted response. To aid the user's decision in performing the predicted response, the predicted response UI components 204A and 204B may show information about a pending action directed to the user by the predicted collaborator such as a timestamp and a short description of the pending action. In addition, the predicted response UI components 204A and 204B may provide information about a document associated with the pending action such as a name and file type of the document.

For example, the predicted response UI component 204A displays a pending document sharing action, "Just shared with you" and a document information with a word document symbol on the left and its title, "AIGA Design Presentation—WIP" on the right. In one implementation, if the user activates a link or clicks on the predicted response UI component 204A, the server 112 may open the document, "AIGA Design Presentation—WIP" for the user to view, edit or comment on the document. In another example, the predicted response UI component 204B shows a pending comment action, "I think this is looking good but I'm . . . " and document information with a spreadsheet document symbol and its name, "Notifications Integration Timeline." In response to the user selecting the predicted response UI component 204B, the server 112 may open the document and provide a comment view in the document. In the comment view, the server 112 may allow the user to view the full comment by the predicted collaborator, "Liam O'Connor" and to reply or resolve (e.g., accept or reject) the comment.

Figure 3:
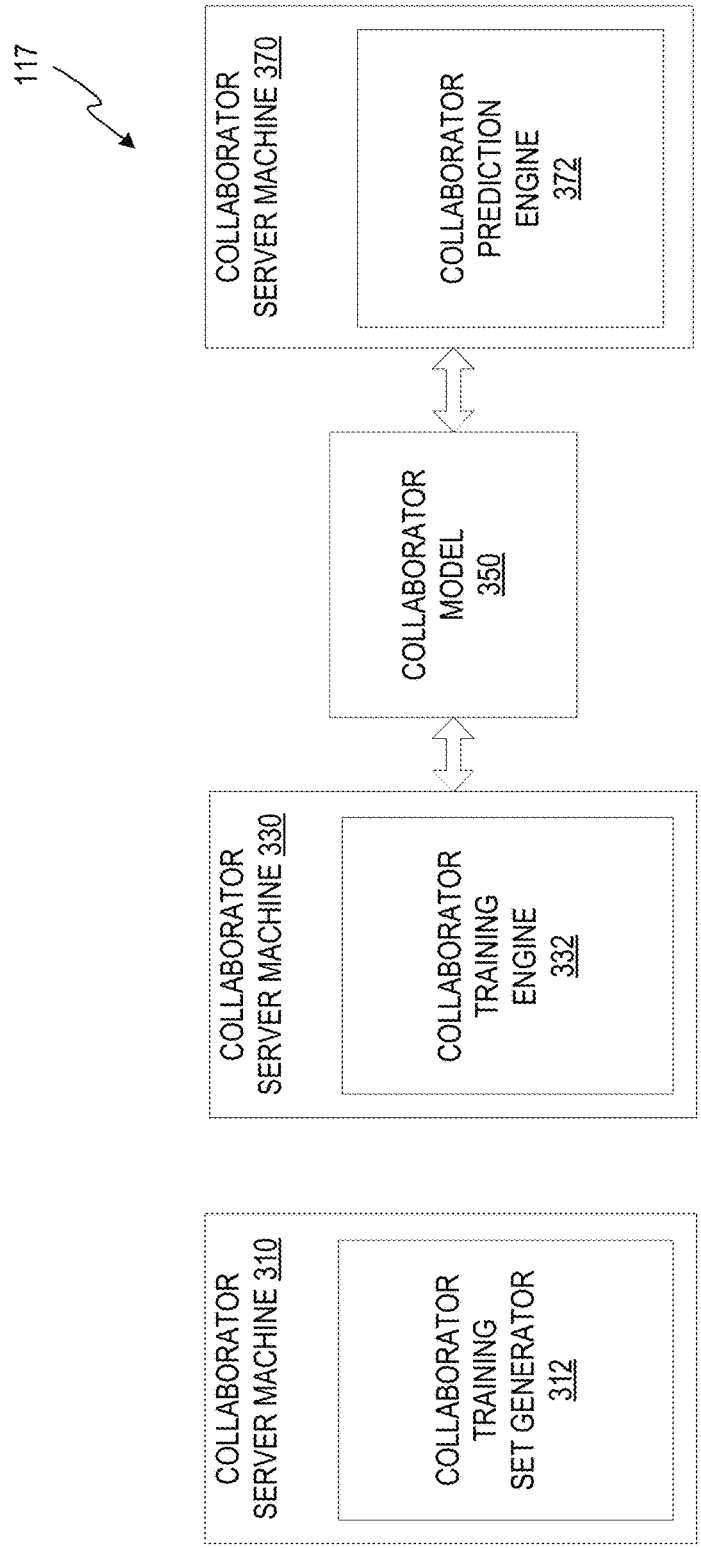
FIG. 3 depicts an example collaborator predictor, in accordance with one implementation of the present disclosure.

FIG. 3 depicts an example collaborator predictor 117 of FIG. 1, in accordance with one implementation of the present disclosure. The collaborator predictor 117 has collaborator server machines 310, 330, and 370 and a collaborator model 350.

In implementations, collaborator server machine 310 includes a collaborator training set generator 312 that is capable of generating training data (e.g., a set of training inputs and target outputs) to train a machine learning model. Some operations of collaborator training set generator 312 are described in detail below with respect to FIG. 4.

Collaborator server machine 330 includes a collaborator training engine 332 that is capable of training a collaborator model 350. The collaborator model 350 is a machine learning model that may refer to the model artifact that is created by the collaborator training engine 332 using the training data that includes training inputs and corresponding target outputs (e.g., recorded user answers for respective training inputs). The collaborator model 350 may also be referred to as a machine learning model 350 herein. The collaborator training engine 332 may find patterns in the training data that map the training input to the target output (the actual answers), and provide the machine learning model 350 that captures these patterns. The machine learning model may be composed of, e.g., a single level of linear or non-linear operations (e.g., a support vector machine [SVM] or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. In one aspect, the collaborator server machine 330 may obtain the training set from the collaborator server machine 310.

Collaborator server machine 370 includes a collaborator prediction engine 372 that is capable of providing a set of collaboration attributes for each new user identified as a potential collaborator (another user that currently has documents with pending actions directed to the user) as an input to a trained machine learning model 350 and running the model 350 on the input to obtain one or more outputs. In implementations, the collaborator prediction engine 372 may obtain outputs indicating a probability for each potential collaborator as described in detail below with respect to FIG. 8. The outputs may be a numerical value between 0 and 1. The probability may indicate of a likelihood that the user will collaborate with a potential collaborator.

It should be noted that in some other implementations, the functions of collaborator server machines 310, 330, and 370 may be provided by a fewer number of machines. For example, in some implementations, collaborator server machines 310 and 330 may be integrated into a single machine, while in some other implementations, collaborator server machines 310, 330, and 370 may be integrated into a single machine. In addition, in some implementations one or more of collaborator server machines 310, 330, and 370 may be integrated into the cloud-based content management platform 115.

In general, functions described in one implementation as being performed by the cloud-based content management platform 115, collaborator server machine 310, collaborator server machine 330, and/or collaborator server machine 170 can also be performed on the user devices 120A through 120Z in other implementations, if appropriate. In addition, the functionality attributed to a particular component can be performed by different or multiple components operating together.

Figure 4:
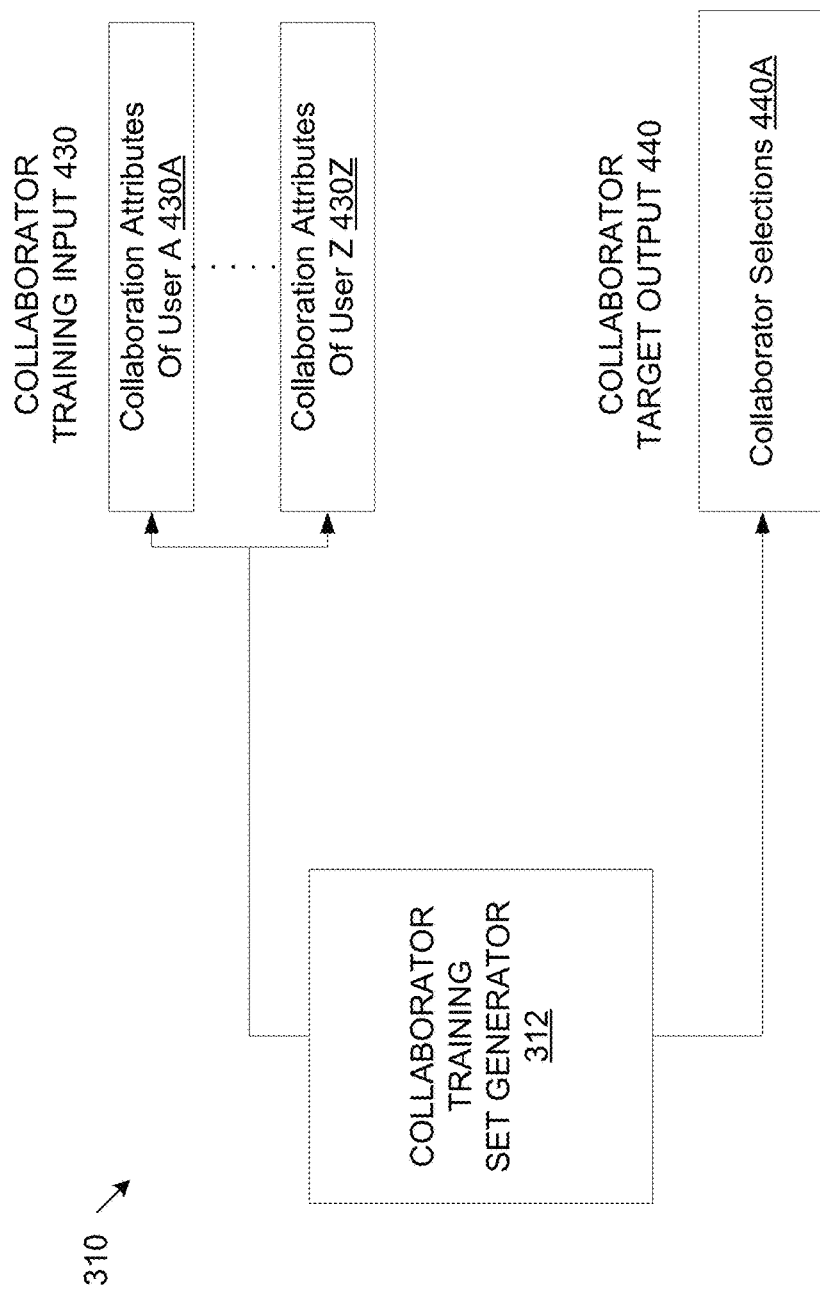
FIG. 4 illustrates an example training set generator to create training data for a machine learning model using collaborator information, in accordance with implementations of the disclosure.

FIG. 4 illustrates an example collaborator training set generator 312 of FIG. 3 within the collaborator server machine 310 to create training data for a machine learning model 350 using collaboration information, in accordance with implementations of the disclosure.

The collaborator server machine 310 includes the collaborator training set generator 312 and a data store that stores collaborator training inputs 430 and collaborator target outputs 440. In some implementations, that data store that stores the collaborator training inputs 430 and collaborator target outputs 440 is the data store 114 of FIG. 1. In implementations, the collaborator training set generator 312 generates collaborator training data that includes one or more collaborator training inputs 430, and one or more collaborator target outputs 440. The collaborator training data may also include mapping data that maps the collaborator training inputs 430 to the collaborator target outputs 440. The collaborator training inputs 430 may also be referred to as "features," "attributes," or "information." The collaborator training inputs 430 include collaboration attributes 430A-430Z of each user identified as potential collaborators. The collaborator training outputs 440 include collaborator selections 440A by the user from the user's collaborative action. In some implementations, the collaborator training set generator 312 may provide the collaborator training data 430 and 440 in a training set, and provide the training set to the collaborator training engine 332 where the training set is used to train the machine learning model 350.

Figure 5:
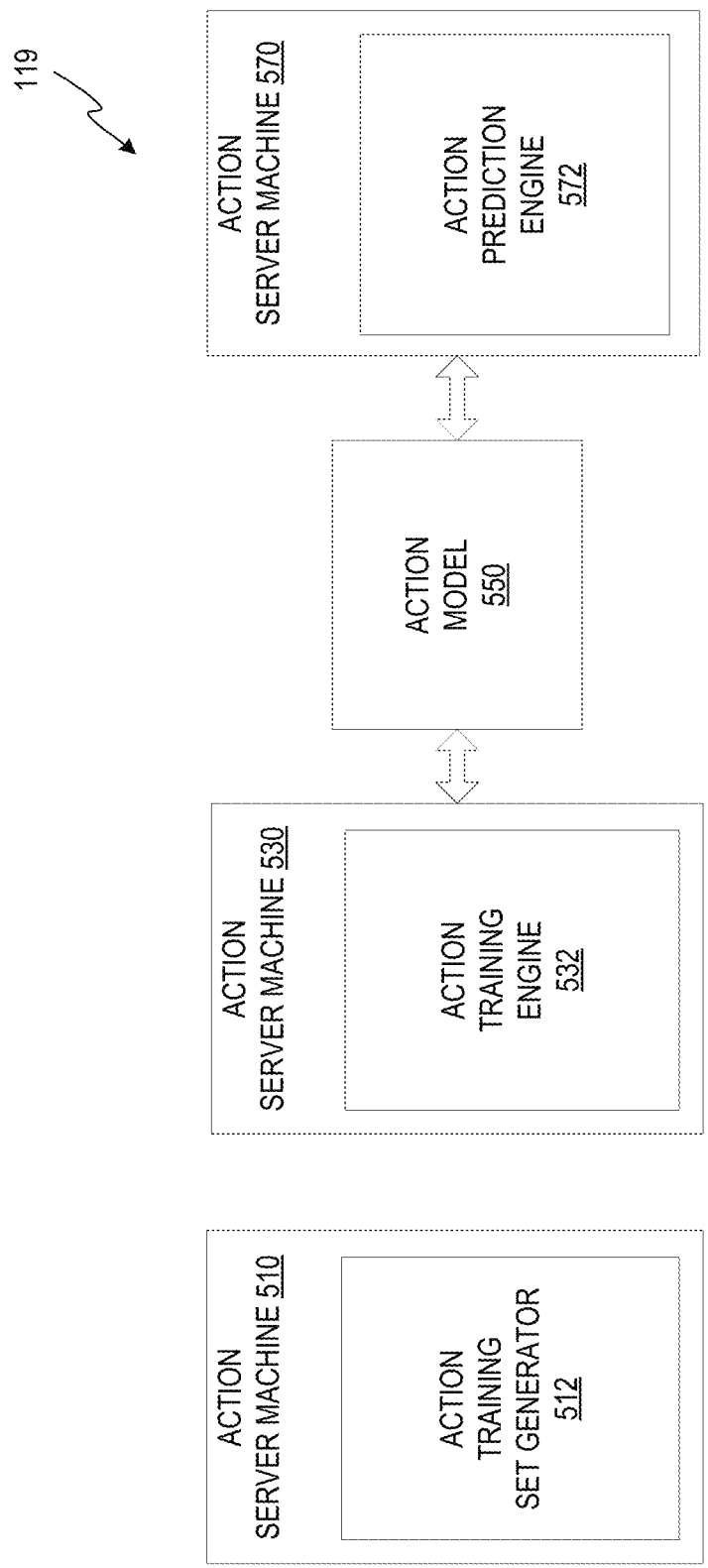
FIG. 5 depicts an example action predictor, in accordance with one implementation of the present disclosure.

FIG. 5 depicts an example action predictor 119 of FIG. 1, in accordance with one implementation of the present disclosure. The action predictor 119 has action server machines 510, 530, and 570 and an action model 550.

In implementations, action server machine 510 includes an action training set generator 512 that is capable of generating training data (e.g., a set of training inputs and target outputs) to train a machine learning model. Some operations of action training set generator 512 are described in detail below with respect to FIG. 6.

Action server machine 530 includes an action training engine 532 that is capable of training an action model 550. The action model 550 is a machine learning model that may refer to the model artifact that is created by the action training engine 532 using the training data that includes training inputs and corresponding target outputs (e.g., recorded user answers for respective training inputs). The action model 550 may also be referred to as a machine learning model 550 and be of the same type as the collaborator model 350 of FIG. 3. The action training engine 532 may operate in the same way as the collaborator training engine 332 described above to find patterns in the training data and provide the machine learning model 550 that captures these patterns.

Action server machine 570 includes an action prediction engine 572 that is capable of providing a set of action attributes of a currently pending action directed to the user by another user who may be a potential collaborator, as an input to a trained machine learning model 550. The action prediction engine 572 is also capable of running the model 550 on the input to obtain one or more outputs. In some implementations, the action training inputs 630 and action target outputs 640 may be stored in the data store 114 of FIG. 1. In implementations, the action prediction engine 572 may obtain outputs indicating a probability of a user response to each pending action as described in detail below with respect to FIG. 11. The outputs may be a numerical value between 0 and 1. The probability may indicate a likelihood that the user will respond to a pending action by another user and/or the type of response that the user will provide.

Figure 6:
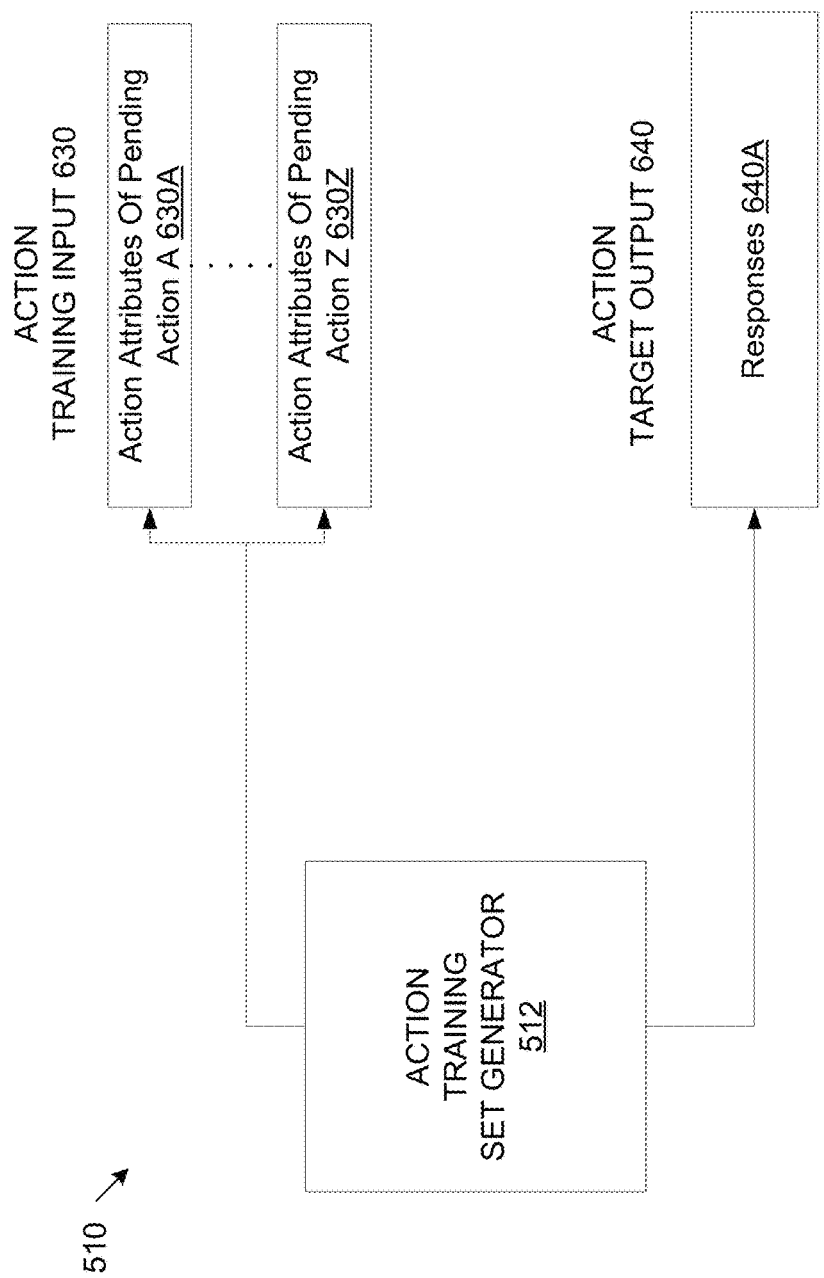
FIG. 6 illustrates an example action training set generator to create training data for a machine learning model using action information, in accordance with implementations of the disclosure.

FIG. 6 illustrates an example action training set generator 512 of FIG. 5 to create training data for a machine learning model 550 using action information, in accordance with implementations of the disclosure.

The action server machine 510 includes the action training set generator 512 and a data store that stores action training inputs 630 and action target outputs 640. In implementations, the action training set generator 512 generates action training data that includes one or more action training inputs 630, and one or more action target outputs 640. The action training data may also include mapping data that maps the action training inputs 630 to the action target outputs 640. The action training inputs 630 include action attributes 630A-630Z of each pending action by another user who may be a potential collaborator. The action training outputs 640 include responses 640A by the user. In some implementations, the action training set generator 512 may provide the action training data 630 and 640 in a training set, and provide the training set to the action training engine 532 where the training set is used to train the machine learning model 550.

Figure 7:
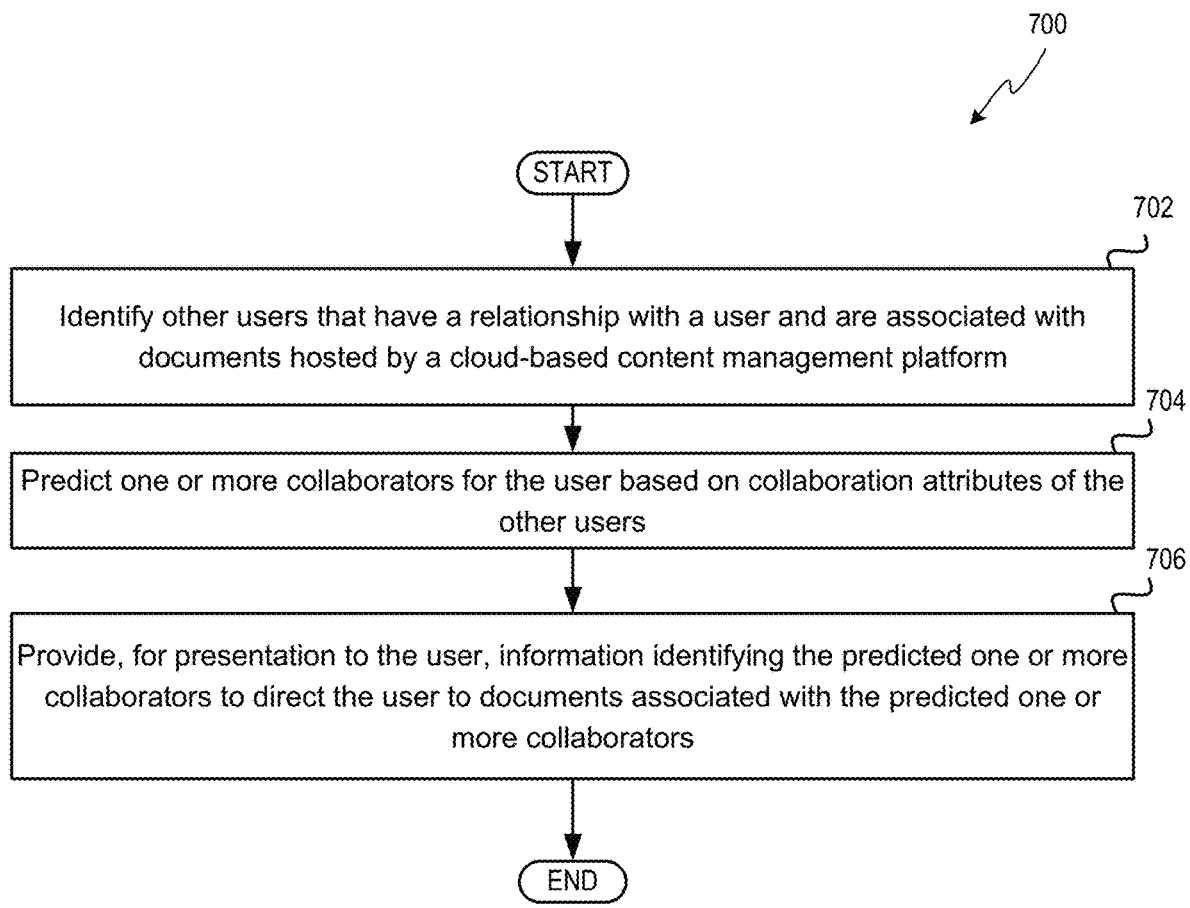
FIG. 7 illustrates a flow diagram of a method for predicting a collaborator for a user, in accordance with some aspects of the disclosure.

FIG. 7 illustrates a flow diagram of a method 700 for predicting a collaborator for a user, in accordance with some aspects of the disclosure.

The method 700 may be performed by collaborator predictor 117 of FIG. 1. In another implementation, method 700 may be performed by a client application executed by one or more processing devices of the server 112. The method 700 may be carried out for each user of the cloud-based content management platform 115. Further, the method 700 may be performed when a user requests the server 112 to provide a list of documents shared with the user.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 702, the collaborator predictor 117 (e.g., collaborator prediction engine 372) may identify, for a user, other users that may have a relationship with the user and may be associated with documents hosted by the cloud-based content management platform 115. The collaborator predictor 117 may determine these other users by analyzing the user's actions (or the user's behavior) associated with documents hosted by the cloud-based content management platform 115, calendar events, email messages and text messages, and identifying other users also associated with those documents, calendar events, email messages and text messages. In some implementations, the analyzed actions of the user may be within the last predetermined number of days. The identified users may represent past collaborators the user have worked with. They may be a useful starting point in funneling down to a couple of prospective collaborators the user will likely to collaborate with.

For example, the collaborator predictor 117 may extract the user's collaboration events such as editing, sharing, and commenting actions, associated with documents hosted by the cloud-based content management platform 115. In some implementations, the collaborator predictor 117 may determine collaboration events from the user's space in the cloud-based content management platform 115 where the user is allowed to store, search, and access documents therein. In one illustration, the collaborator predictor 117 may extract the user's comment events and share events to and from other users in the cloud-based content management platform 115. The collaborator predictor 117 may identify the comment events and share events from the user's action list within the user's space or from documents hosted by the cloud-based content management platform 115, regardless of the user's space.

In addition, the collaborator predictor 117 may analyze data (input and/or output data) that is related to the user and that pertains to various services provided by the cloud-based content management platform 115 in order to identify potential collaborators. Examples of the services may include a recent document search, a document search by an owner of the document, and a document share amongst multiple users. If the user has used these services, the collaborator predictor 117 can extract other users involved therein.

In one implementation, the collaborator predictor 117 may determine that the other user has a relationship with the user if the other user has at least a predetermined number of recent actions involving the user. For example, the collaborator predictor 117 may determine that the other user has a relationship with the user if the other user has at least a predetermined number of recently shared documents with the user. In another example, the collaborator predictor 117 may determine the other user has a relationship with the user if the other user will be attending at least a predetermined number of calendar events for collaboration with the user in a near future. The collaborator predictor 117 can make this determination by determining attendees of future calendar events (future collaborative calendar event attendance actions) to identify potential collaborators. An example of the collaborative calendar event can be a project team meeting with a document attached to the calendar event. The collaborator predictor 117 may consider any attendees to the project team meeting as users that have a relationship with the user and are associated with documents hosted by the cloud-based content management platform 115.

The collaborator predictor 117 may also look into communication actions of the user via communication channels (e.g., emails and messages) on the cloud-based content management platform 115 and identify potential collaborators by determining other users (e.g., recipients and/or senders) associated with the communication actions.

In addition to the actions of the user, the collaborator predictor 117 may determine potential collaborators from affiliations of the user in association with the cloud-based content management platform 115. Examples of the affiliations can be from the user's contact list and a membership to a group space on the cloud-based content management platform 115. The group space may allow members of the group space to store, search, and access documents in the group space. In one embodiment, the contact list may have a list of profiles of users of the cloud-based content management platform 115. The users of the cloud-based content management platform 115 may have documents hosted by the cloud-based content management platform 115. In another embodiment, the contact list may include a level of affinity with the user for each contact profile.

After identifying other users from the actions and affiliations of the user, at block 704, the collaborator predictor 117 may predict one or more collaborators for the user based on collaboration attributes. The collaborator predictor 117 may implement a machine learning model approach and/or a heuristics approach. When either or both approaches fail due to a network or system problem, or the prediction operation takes too long, the collaborator predictor 117 may resort to a fallback approach to be discussed later with respect to FIG. 13. Aspects of the machine learning model approach will be discussed in more detail below in relation to FIG. 8 and aspects of the heuristics approach will be discussed in more detail below in relation to FIG. 9.

The collaborator predictor 117 may determine collaboration attributes of the other users identified at block 702. The collaboration attributes may include a frequency of collaboration with the user, a recency of collaboration with the user, a responsiveness of the user to actions of a respective other user associated with the plurality of documents hosted by the cloud-based content management platform 115, and affinity of the user for the respective other user based on the affiliations of the user in association with the cloud-based content management platform 115. In some implementations, the collaboration attributes may further include a presence indication with respect to the other user. The presence indication may refer to a concurrent interaction of the respective other user and the user with documents hosted by the cloud-based content management platform 115. For example, such concurrent interaction may occur when the user and another user concurrently edit and/or view a document.

Moreover, the collaboration attributes may include an overlap between the actions and affiliations of the user in association with the cloud-based content management platform 115 and actions and affiliations of the respective other user in association with the cloud-based content management platform 115. To identify the overlap, the collaborator predictor 117 may use a bipartite graph that maps the user and the potential collaborators from block 702 to recent actions and affiliations as described with regards to block 702. In the bipartite graph, the user and the potential collaborators are placed on one side and items involved in the actions and affiliations of the user and potential collaborators in association with the cloud-based content management platform 115 on the other side. The bipartite graph also includes edges from the user side to the item side. The items may be a document, a user space, a group space, a calendar event, an email or a message thread. Then, the collaborator predictor 117 may determine a degree of overlap to which a potential collaborator's mapping overlaps with the user's mapping. In some implementations, the collaborator predictor 117 may measure the degree of overlap based on an absolute number of overlapping items, which indicates on how many items the user and the potential collaborator work together, a coverage of the potential collaborator on the user's items which signals how much the potential collaborator is involved in what the user does, a coverage of the user on the potential collaborator's items, which signals how much the user is involved with what the potential collaborator does, a percentage of overlapping items in all items between the user and the potential collaborator which shows another indication of how much the user and the potential collaborator work together. The collaborator predictor 117 can apply weights on the edges by frequency and recency to apply intensity of collaboration by the user and the potential collaborators.

At block 706, the collaborator predictor 117 provides, for presentation to the user, information identifying the predicted collaborators from block 704 to direct the user to documents that are, each associated with one of the predicted collaborators. As shown in predicted collaborator UI component 202 of FIG. 2, the collaborator predictor 117 may provide identity of the predicted collaborator so that the user may quickly access or search any documents owned by the predicted collaborator to advance collaboration.

Figure 8:
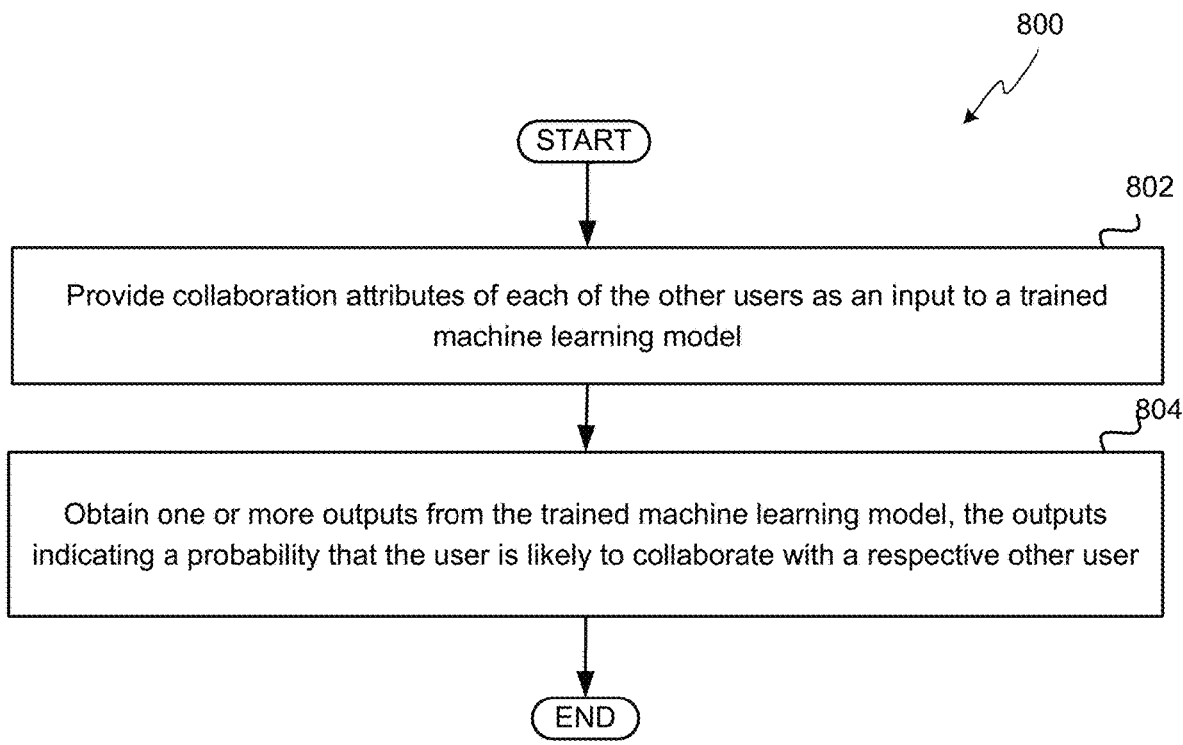
FIG. 8 depicts a flow diagram of a method for using a trained machine learning model with respect to collaboration attributes of other users to predict a collaborator for a user, in accordance with some aspects of the disclosure.

FIG. 8 depicts a flow diagram of a method 800 for using a trained machine learning model with respect to collaboration attributes of other users to predict a collaborator for a user, in accordance with some aspects of the disclosure regarding block 704 of FIG. 7.

At block 802, the collaborator predictor 117 (e.g., collaborator training engine 332) may provide a set of collaboration attributes of each other user identified at block 702 as input to a trained machine learning model 350. Then, at block 804, the collaborator predictor 117 may obtain one or more outputs from the trained machine learning model 350.

The outputs may indicate a probability that the user will collaborate with each potential collaborator identified at block 702. In some implementations, the probability may pertain to a near future collaboration.

In order to train the machine learning model 350 for the method 800, the collaborator predictor 117 may provide training data to train the machine learning model 350 on a set of training inputs and a set of target outputs. The set of training inputs may comprise collaboration attributes of different other users (e.g., other users with past pending actions involving the user) than the other users identified in block 702 (e.g., other users with currently pending actions involving the user). In another embodiment, the set of other users for training the machine learning model 350 may include the other users identified in block 702 (e.g., if the other users had past pending actions involving the user and also have currently pending actions involving the user). The set of target outputs may comprise selections by the user of previous users from the input set of other users as collaborators. The collaborator predictor 117 may determine the selections if the user takes collaborative actions towards the other users such as responding to comments of the other users and opening or reviewing a document shared by the other users. After the machine learning model 350 is trained, the collaborator predictor 117 may carry out the method 800. The training of the machine learning model 350 may continue by monitoring user actions with respect to documents of predicted collaborators to determine whether the predictions made based on the machine learning model 350 match the actual selections of the user, and by using the determined results together with collaboration attributes of the predicted collaborators as additional training data for the machine learning model 350.

Figure 9:
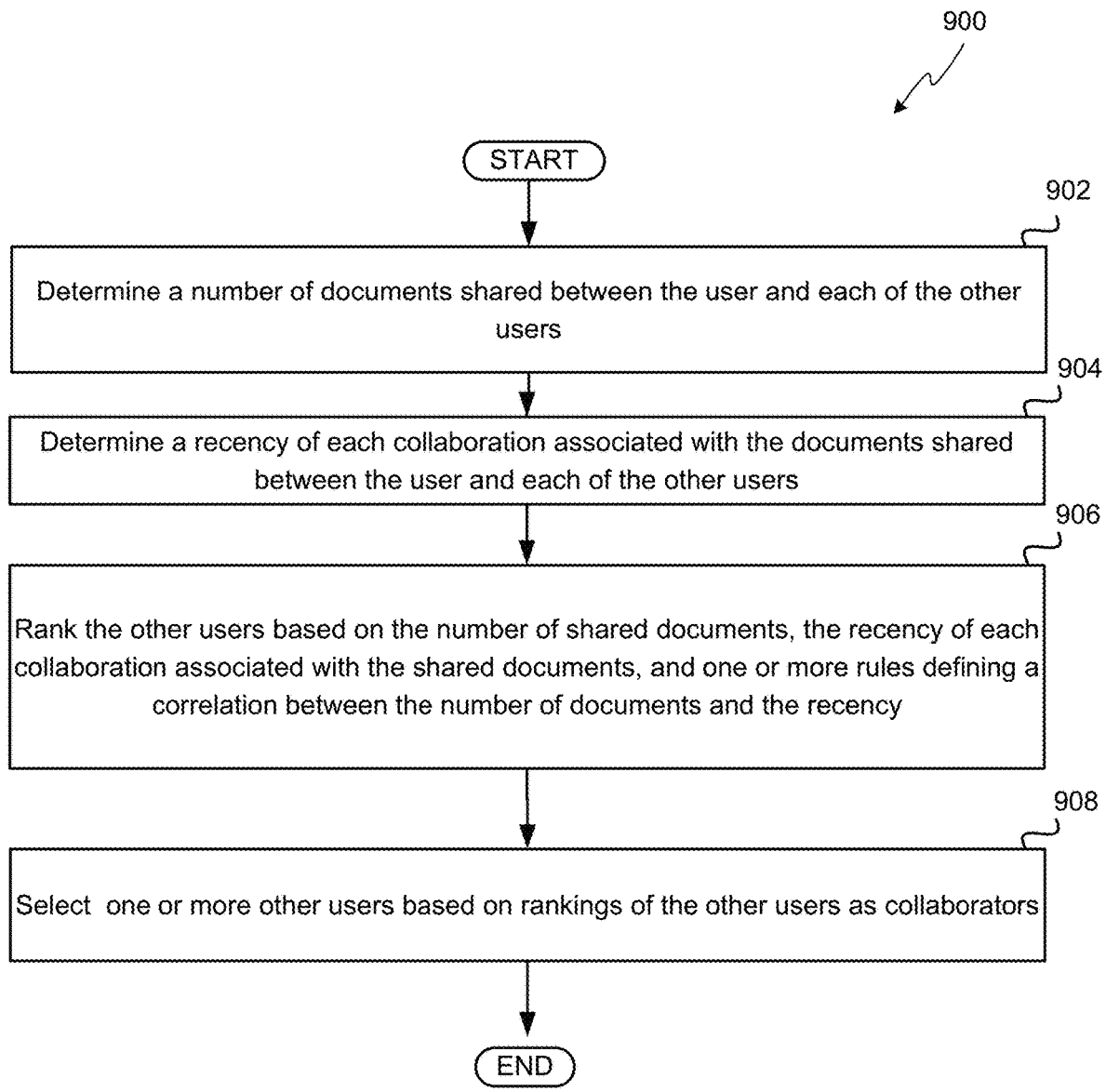
FIG. 9 illustrates a flow diagram of a method for using a heuristic approach with respect to shared documents and collaboration between a user and other users to predict a collaborator for the user, in accordance with some aspects of the disclosure.

FIG. 9 illustrates a flow diagram of a method 900 for using a heuristic approach with respect to shared documents and collaboration between a user and other users to predict a collaborator for the user, in accordance with some aspects of the disclosure regarding block 704 of FIG. 7. The method 900 may apply a heuristics model with a linear function, with a simple weighted sum having an ad-hoc weighing of collaboration attributes.

At block 902, the collaborator predictor 117 may determine, based on the collaboration attributes of the other users identified at block 702, a number of documents shared between the user and each of the other users. In an embodiment, the collaborator predictor 117 may further determine a number of calendar events, emails and/or message threads in common between the user and each of the other users, and may add those counts to the number of shared documents.

At block 904, the collaborator predictor 117 may determine, based on the collaboration attributes of the other users identified at block 702, a recency of each collaboration between the user and each of the other users with respect to corresponding documents.

At block 906, the collaborator predictor 117 may rank the other users identified at block 702 based on the number of documents shared, the recency of each collaboration associated with the documents shared, and one or more rules defining a correlation between the number of documents and the recency. The collaborator predictor 117 may apply the correlation rule by providing more weight to a recent count of documents shared and less weight to a far distant count of documents. In some implementations, the collaborator predictor 117 may rank the potential collaborators only based on a number of common documents between the user and other users. In such implementations, the collaborator predictor 117 may incorporate recency aspect of collaboration by applying a temporal decay function to the ranking. The temporal decay function may include a linear decay or exponential decay.

At block 908, the collaborator predictor 117 may select one or more other users based on rankings of the other users (by ordering the other users based on their rankings and selecting a predefined number or percentage of other users with the highest ranking or selecting other users with rankings that exceed a threshold). In one embodiment, the selected other users represent the predicted collaborators.

To collaborator predictor 117 may adjust the heuristics rules by determining whether a selection of a collaborator by the user matches any of the predicted collaborators. In some implementations, the collaborator predictor 117 monitors user actions after the prediction to determine whether the user has collaborated with any of the predicted collaborators. In response to the user's selection being different from the predicted collaborators, the collaborator predictor 117 may modify the rules. For example, if the user does not take collaborative actions with respect to the predicted collaborators and instead, collaborates with someone else, the collaborator predictor 117 may adjust the heuristics rules to provide more accurate prediction in the future.

Figure 10:
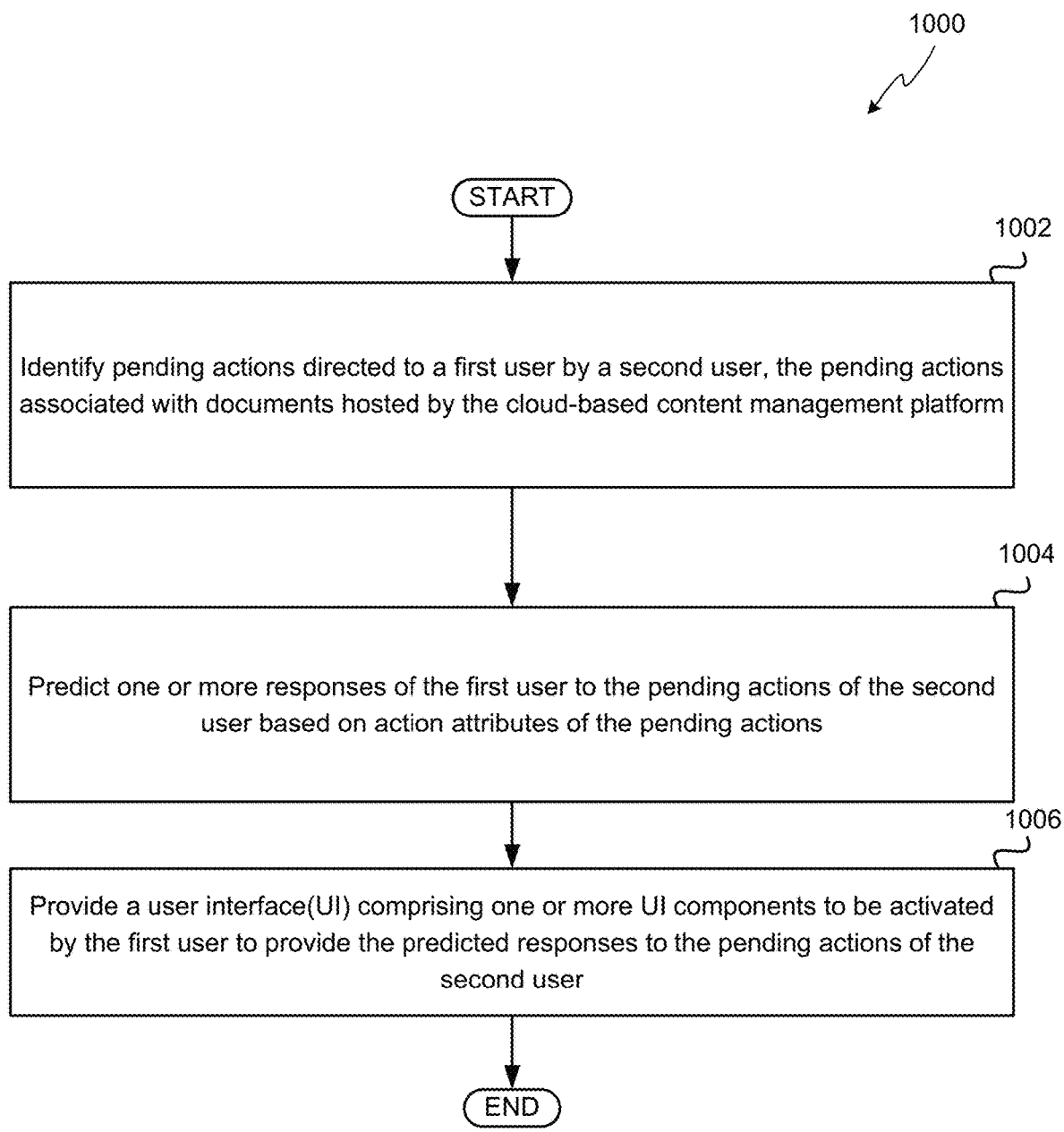
FIG. 10 depicts a flow diagram of a method for predicting responses of a user to pending actions directed to the user by another user, in accordance with some aspects of the disclosure.

FIG. 10 depicts a flow diagram of a method 1000 for predicting responses of a user to pending actions directed to the user by another user, in accordance with one implementation of the disclosure.

The method 1000 may be performed by the response predictor 119 of FIG. 1. In another implementation, method 1000 may be performed by a client application executed by one or more processing devices of the server 112. The method 1000 may be carried out for each user of the cloud-based content management platform 115. Further, the method 1000 may be performed when a user requests the server 112 to provide a list of documents shared with the user. In some other implementations, the method 1000 may be carried out after the method 700 is performed, and can be performed for each predicted collaborator resulting from method 700.

At block 1002, the action predictor 119 may identify, for a user ("first user") of a cloud-based content management platform 115, pending actions directed to the first user by another user ("second user") of the cloud-based content management platform 115. The second user may be a previously-predicted collaborator (e.g., using method 700 or any other mechanism) or any other user selected randomly or based on predefined criteria. The pending actions by the second user may be associated with documents hosted by the cloud-based content management platform 115. Examples of the pending actions directed to the first user by the second user may include an invitation to the first user to share a document, an invitation to respond or resolve a comment in relation to the document, an invitation to review a shared document or an edit to the document, etc.

At block 1004, the action predictor 119 may predict one or more responses of the first user to the pending actions of the second user based on action attributes of the pending actions of the second user. Examples of action attributes of a pending action may include an action type of the pending action, a recency of the pending action, or an identity of the second user who initiated the pending action. A response to a pending action associated with a document may involve ignoring a notification or invitation caused by the pending action or performing an operation intended by the pending action. Such an operation can be reviewing the document, sharing the document, editing the document, adding a comment related to the document, resolving a comment related to the document or adding a new comment in relation to a previous comment, etc. The action predictor 119 may implement a machine learning model approach and/or a heuristics approach. When both approaches fail due to a network or system problem, or the prediction operation takes too long, the action predictor 119 may resort to a fallback approach to be discussed later with respect to FIG. 13. Aspects of the machine learning model approach will be discussed in more detail in relation to FIG. 11 and aspects of the heuristics approach will be discussed in more detail below in relation to FIG. 12 below.

In some implementations, the action predictor 119 may predict the response of the first user to the pending actions of the second user further based on response history of the first user to previous actions of one or more other users with respect to documents hosted by the cloud-based content management platform 115. The one or more other users may either only include the second user, or include the second user and one or more additional users. Accordingly, in case where the second user is the only other user, the response history only pertains to the second user.

The action predictor 119 may determine the response history of the first user to the previous actions for the prediction. The response history may include, for example, a frequency the first user has responded to a comment by another user (and optionally distinguished by the comment's length), a frequency the first user has opened a document of another user, a frequency the first user has edited a document of another user, a frequency the first user has edited a document of another user, a ratio of a number of times the first user has edited the documents for another user to a number of times the first user has commented on the documents for a respective user, etc.

The response history may also include various ratios between a number of times the first user has taken a certain action to previous actions of other users versus a number of times the first user has ignored other previous actions of the same users. For example, a ratio between the first user providing a comment in response to some previous actions of one or more other users and the first user ignoring some other previous actions of the one or more other users, a ratio between the first user editing a document in response to some previous actions by other users and the first user ignoring some other previous actions, and a ratio between the first user opening a document in response to some previous actions of the one or more other users and the first user ignoring some other previous actions by the one or more other users.

In some other implementations, the action predictor 119 may run a natural language processing (NLP) analysis on comments of pending actions, where applicable. The action predictor 119 may perform topic and sentiment analysis on contents of the comments.

At block 1006, the action predictor 119 may provide a UI for presentation to the first user. The UI may include one or more UI components to be activated by the first user to provide the predicted response(s) to at least some pending actions of the second user. For example, in FIG. 2, the UI components 204 and 206 may provide a link to the first user to open a shared document and reply to a comment, respectively. In this way, the first user may quickly respond to pending actions, without wasting time on locating a document with a pending action and deciding what operation he is expected to perform responsive to the pending action.

Figure 11:
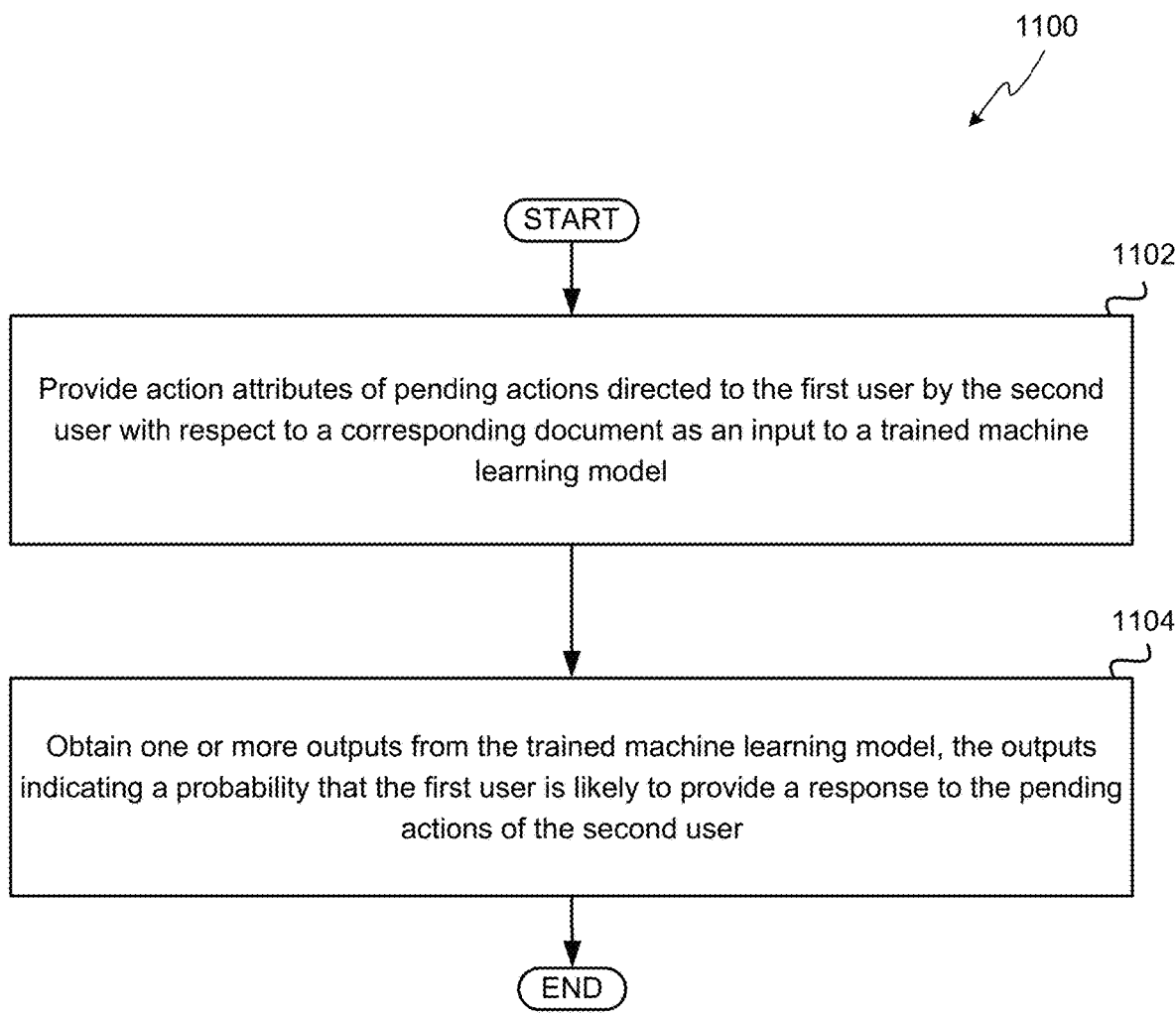
FIG. 11 illustrates a flow diagram of a method for using a trained machine learning model with respect to pending actions directed to a user by another user to predict a response of the user to the pending actions, in accordance with some aspects of the disclosure.

FIG. 11 illustrates a flow diagram of a method 1100 for using a trained machine learning model 550 with respect to pending actions directed to a user by another user to predict a response of the user to the pending actions, in accordance with some aspects of the disclosure regarding block 1004 of FIG. 10.

At block 1102, the action predictor 119 may provide action attributes of each pending actions directed to a user ("first user") by another user ("second user") with respect to a corresponding document as input to a trained machine learning model 550. Then, at block 1104, the action predictor 119 may obtain one or more outputs from the trained machine learning model 550. The outputs may indicate, for each pending action of the second user, a probability that the first user is likely to provide a response to a respective pending action. In some implementations, the probability may pertain to a near future response such as a probability of the first user responding today.

In order to train the machine learning model 550 for the method 1100, the action predictor 119 may provide training data to train the machine learning model 550 on a set of training inputs and a set of target outputs. The set of training inputs may comprise action attributes of previous actions directed to the first user by other users. The other users may include the second user. The set of target outputs may comprise responses by the first user to the previous actions directed to the first user by other users. After the machine learning model 550 is trained, the action predictor 119 may carry out the method 1100. The training of the machine learning model 550 may continue by monitoring actual responses of the first user to the currently pending actions to determine whether the predictions made based on the machine learning model 550 match the actual responses of the first user, and by using the determined results together with action attributes of the currently pending actions as additional training data for the machine learning model 350.

Figure 12:
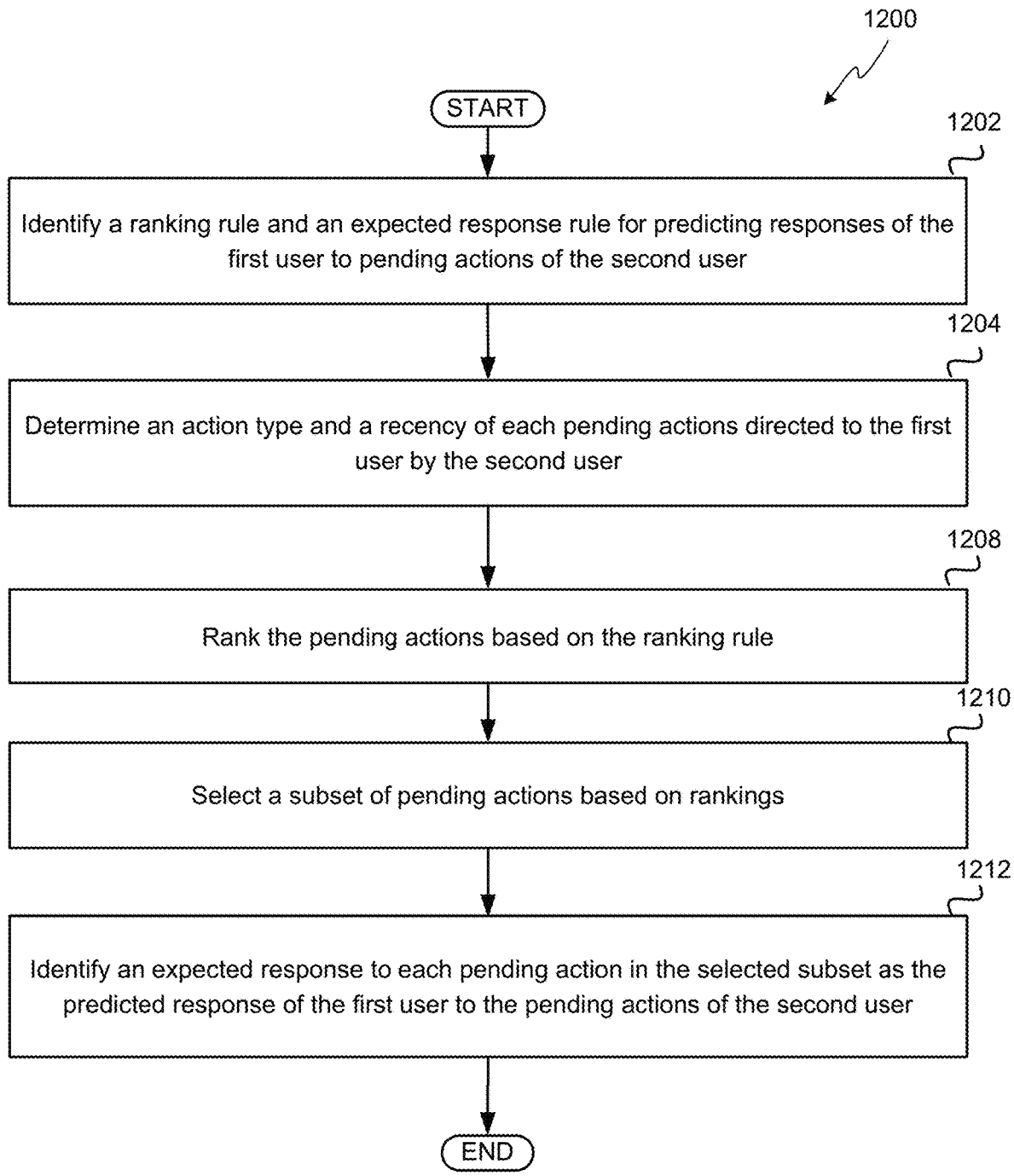
FIG. 12 depicts a flow diagram of a method for using a heuristic approach with respect to pending actions directed to a user by another user to predict a response of the user to the pending actions, in accordance with some aspects of the disclosure.

FIG. 12 depicts a flow diagram of a method 1200 for using a heuristic approach with respect to pending actions directed to a user by another user to predict a response of the user to the pending actions, in accordance with some aspects of the disclosure regarding block 1004 of FIG. 10. The method 1200 may apply the same heuristics model described with respect to FIG. 9.

At block 1202, the action predictor 119 may identify one or more rules for predicting one or more responses of a user ("first user") to pending actions of another user ("second user"). The rules may include a ranking rule. In some implementations, the rules also include an expected response rule. The ranking rule may define how to rank a pending action based on a correlation between an action type and a recency of the pending action. For example, the action predictor 119 may apply the ranking rule by providing more weight to a recent action having a specific action type and less weight to a similarly recent action but belonging to a different action type. The action may be represented by a timestamp. The expected response rule may define expected responses to pending actions of different types. The ranking rule may be derived based on the response history of the first user to the previous pending actions by other users. The expected response rule may be derived based on the response history of the first user and optionally other users to previous pending actions.

Then, at block 1204, the action predictor 119 may determine an action type and a recency of each pending action directed to the first user by the second user. In one embodiment, the action predictor 119 may further determine an identity of the second user. At block 1208, the action predictor 119 may rank each pending action based on the action type and recency of each pending action and the ranking rule. Then, the action predictor 119, at block 1210, may select some pending actions based on rankings of the pending actions (e.g., by selecting a predefined number or percentage of pending actions with the highest rankings or by selecting pending actions with rankings that exceed a threshold). The selected pending actions can represent pending actions that the first user is likely to respond to by performing an intended operation (e.g., opening a document, reviewing, editing or commenting on a document, resolving a comment associated with a document, etc.), as opposed to ignoring the pending action or otherwise indicating lack of interest in the pending action.

In some implementations, at block 1212, the action predictor 119 may further predict a response to each selected pending action based on the type of the action and the expected response rule.

To refine the heuristics approach of the method 1200, the action predictor 119 may determine whether the user responded as intended to the selected pending action(s), and in implementations that use the expected response rule, whether the user response(s) to the selected pending action (s) matches any of the predicted responses. Thus, the action predictor 119 can monitor actions of the first user after the predictions to determine whether the predictions based on the heuristics rule(s) are accurate, and can modify the ranking rule and optionally the expected response rule if the predictions are not accurate. For example, if the first user does not respond as intended to the selected pending actions or provides responses different from the predicted response, the action predictor 119 may adjust either or both the ranking and expected response rules to provide more precise prediction in the future.

Figure 13:
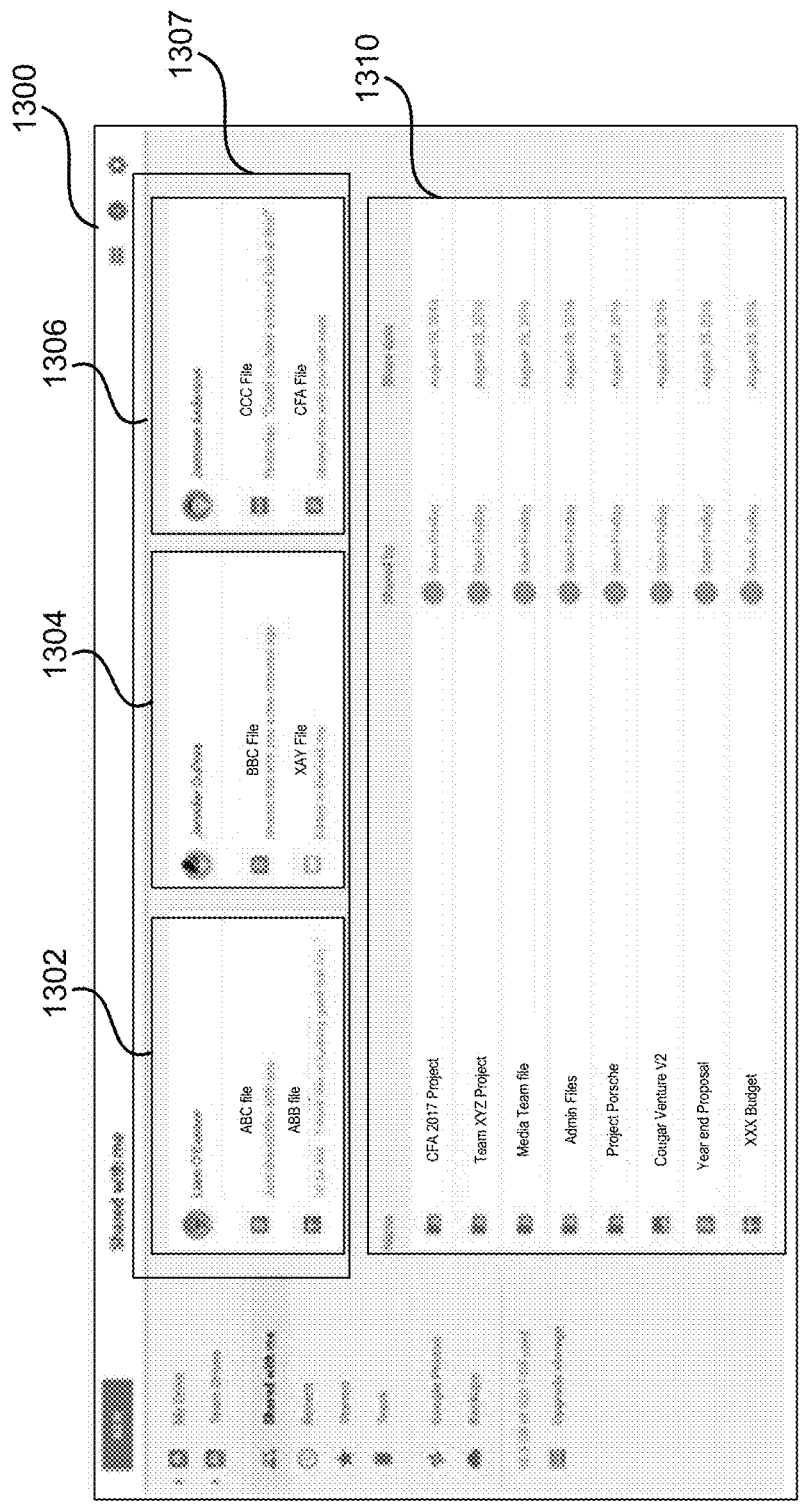
FIG. 13 illustrates an example user interface of a cloud-based content management platform displaying documents shared with a user along with predicted collaboration information for the user, in accordance with one implementation of the disclosure.

FIG. 13 illustrates an example UI 1300 of the cloud-based content management platform 115 displaying a list of documents shared with a user in a first area 1310 of the UI along with predicted collaboration information for the user (prediction cards 1302, 1304, and 1306) in a second area 1307 of the UI, in accordance with one implementation of the disclosure. The first area 1310 may display the list of documents shared with the user to allow the user to initiate collaboration. Alternatively, the first area 1310 may display a document search page or document sharing dialogues. In one implementation, to provide the set of prediction cards, the collaboration prediction engine 116 may predict collaborators that the user will collaborate with as per the method 700 of FIG. 7, then, for each predicted collaborator, the collaboration prediction engine 116 may predict responses the user will perform as per the method 1000 of FIG. 10. The collaboration prediction engine 116 may utilize either a machine learning approach or heuristics approach as described with respect to FIGS. 8, 9, 11, and 12. After the response prediction, the collaboration prediction engine 116 may compose a prediction card 1302, 1304, or 1306 based on the predicted collaborators and predicted responses. The collaboration prediction engine 116 may then display the prediction cards 1302, 1304, and 1306 on an UI of the cloud-based content management platform 115. Prediction cards provide the user with very easy and convenient access to a relevant document.

In a conventional collaborative environment, documents are, for example, located and loaded for each pending actions and/or for each user, to enable each user to quickly review the documents and the pending actions, which leads to significant use of network bandwidth and processing resources in the cloud-based collaborative environment. Such locating and loading of documents for each pending action of each user in conventional collaborative environment may include many documents that the user has no interest in, resulting in wasteful use of resources. The disclosed technology improves this situation. The predicted collaborators and predicted responses allow the cloud-based collaboration platform to locate and load only a small number, (i.e. a subset of documents for a few specific collaborators that are specified by the prediction, e.g. each document being associated with one of the predicted one or more collaborators; i.e. a subset of documents for a few specific pending actions), and generate and display a user interface, for example in the form of prediction cards as discussed above, to provide the user with very easy and convenient access to a relevant document. In that manner, also the usability of the cloud-based collaboration platform is improved, since a more targeted interaction of the user with collaborators and related pending actions and documents is enabled.

During the prediction of the collaborators and/or responses, if the collaboration prediction engine 116 cannot carry out the machine learning approach and heuristics approach because of a system error or network error, or there is a substantial delay in providing prediction results, the collaboration prediction engine 116 may resort to fallback approaches. The collaboration prediction engine 116 may take either a client-side or server-side fallback approach for the prediction of the collaborators and response. The client-side fallback approach can utilize the data the user already received to load an UI displaying the list of files shared with the user. Accordingly, for the collaborator prediction, the collaboration prediction engine 116 may identify every user associated with the files shared with the user and then select a predefined number of users associated with the highest number of files shared with the user as predicted collaborators that the user will likely to collaborate with. In case of the response prediction, the collaboration prediction engine 116 may identify documents of the predicted collaborators, then the collaboration prediction engine 116 may select actions from a predetermined number of most recent documents related to the predicted collaborators as predicted response the user will likely to respond to. The client-side fallback approach has the effect that prediction of potential collaborators and responses is possible even without or with limited network connectivity, making the operation of client-side collaborative tools for the cloud-based content management platform more resilient against network failure.

The server-side fallback approach can involve running the same queries (i.e., frequent past collaborators and their recent documents) as those used by the client-side fallback approach but on the data stored in the server 112. Additionally, the server-side fallback approach can further consider cached copies of previous requests to the server 112 by the user and cached actions of the user associated with the cloud-based content management platform 115. These fallback approaches allow the collaboration prediction engine 116 to display at least some prediction in the prediction cards 1302, 1304, and 1306 when the machine learning approach and heuristics approach fail. The server-side fallback approach has the effect that prediction of potential collaborators and responses as discussed herein by the cloud-based content management platform is possible even if the machine learning approach and heuristics approach are temporarily unavailable. This makes the operation of the cloud-based content management platform more robust from the perspective of a client.

Figure 14:
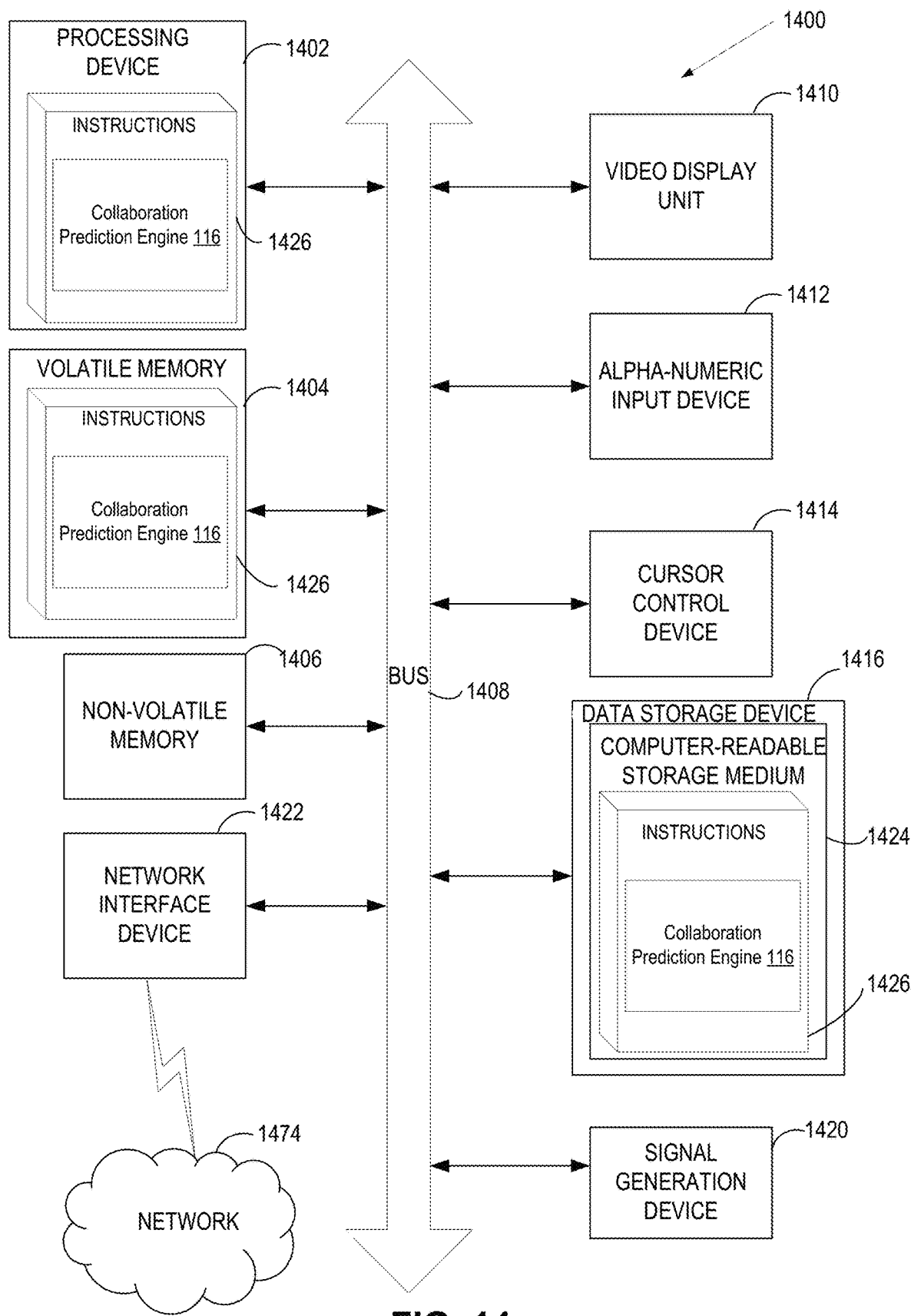
FIG. 14 depicts a block diagram of an example computing system operating in accordance with one or more aspects of the present disclosure.

FIG. 14 depicts a block diagram of an example computing system operating in accordance with one or more aspects of the present disclosure. In various illustrative examples, computer system 1400 may correspond to any of the computing devices within system architecture 100 of FIG. 1. In one implementation, the computer system 1400 may be a server 112. In another implementation, the computer system 1400 may be each of the user devices 120A-120Z.

In certain implementations, computer system 1400 may be connected (e.g., via a network, such as a Local Area Network (LAN), an intranet, an extranet, or the Internet) to other computer systems. Computer system 1400 may operate in the capacity of a server or a client computer in a client-server environment, or as a peer computer in a peer-to-peer or distributed network environment. Computer system 1400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1400 may include a processing device 1402, a volatile memory 1404 (e.g., random access memory (RAM)), a non-volatile memory 1406 (e.g., read-only memory (ROM) or electrically-erasable programmable ROM (EEPROM)), and a data storage device 1416, which may communicate with each other via a bus 1408.

Processing device 1402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1400 may further include a network interface device 1422. Computer system 1400 also may include a video display unit 1410 (e.g., an LCD), an alphanumeric input device 1412 (e.g., a keyboard), a cursor control device 1414 (e.g., a mouse), and a signal generation device 1420.

Data storage device 1416 may include a non-transitory computer-readable storage medium 1424 on which may store instructions 1426 encoding any one or more of the methods or functions described herein, including instructions implementing the collaboration prediction engine 116 of FIG. 1 for implementing the methods described herein.

Instructions 1426 may also reside, completely or partially, within volatile memory 1404 and/or within processing device 1402 during execution thereof by computer system 1400, hence, volatile memory 1404 and processing device 1402 may also constitute machine-readable storage media.

While computer-readable storage medium 1424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method comprising:
   identifying, for a user of a cloud-based content management platform, a plurality of other users of the cloud-based content management platform that have a relationship with the user and are associated with a plurality of documents hosted by the cloud-based content management platform;
   predicting, by a processor, one or more collaborators for the user based on collaboration attributes of the plurality of other users, wherein predicting the one or more collaborators comprises:
      providing a set of collaboration attributes of each of the plurality of other users as input to a trained machine learning model, wherein the input to the trained machine model comprises an indication of a responsiveness of the user to actions of one or more of the plurality of other users that are associated with plurality of documents hosted by the cloud-based content management platform, and
      obtaining one or more outputs from the trained machine learning model, the outputs indicating, for each of the plurality of other users, whether the user is to collaborate with a respective other user, wherein the trained machine learning model is trained on training data comprising a set of training inputs indicative of collaboration attributes of a plurality of potential collaborators and a set of target outputs that correspond to respective training inputs in the set of training inputs, the set of target outputs indicative of one or more selections of potential collaborators from the plurality of potential collaborators; and
   providing, by the processor, for presentation to the user, information identifying the predicted one or more collaborators to direct the user to a subset of documents from the plurality of documents hosted by the cloud-based content management platform, the subset of documents each being associated with one of the predicted one or more collaborators.

2. The method of claim 1, wherein the identifying of the plurality of other users of the cloud-based content management platform comprises:
   determining the plurality of other users from at least one or more of:
      actions of the user associated with the plurality of documents, a calendar, and a communication tool hosted by the cloud-based content management platform, wherein the actions of the user are from a recent predetermined time period;
      affiliations of the user in association with the cloud-based content management platform; or
      a predetermined number of recently shared documents with the user by the plurality of other users.

3. The method of claim 2, wherein:
   the affiliations of the user include one or more of:
      a contact list of the user having a list of profiles of users of the cloud-based content management platform, the contact list including a level of affinity with the user for each profile; or
      a membership to a group space in the cloud-based content management platform that allows members of the group space to store, search, and access documents in the group space; and
   the actions of the user include one or more of:
      a collaboration of the user in association with the plurality of documents hosted by the cloud-based content management platform,
      a document search action on the plurality of documents hosted by the cloud-based content management platform based on a document owner,
      a future collaborative calendar event attendance action, or
      a communication action via a communication tool hosted by the cloud-based content management platform.

4. The method of claim 2, further comprising:
   determining, for each of the plurality of other users of the cloud-based content management platform, the set of collaboration attributes.

5. The method of claim 4, wherein the set of collaboration attributes of a respective other user comprises at least two or more of:
   a frequency of collaboration with the user;
   a recency of collaboration with the user;
   a concurrent interaction of the respective other user and the user with one or more documents from the plurality of documents hosted by the cloud-based content management platform;
   an overlap between i) the actions and affiliations of the user in association with the cloud-based content management platform and ii) actions and affiliations of the respective other user in association with the cloud-based content management platform; or
a level of affinity of the user for the respective other user based on the affiliations of the user in association with the cloud-based content management platform.

6. The method of claim 4, further comprising:
providing the training data to train the machine learning model.

7. The method of claim 1, wherein the predicting of the one or more collaborators for the user based on collaboration attributes of the plurality of other users further comprising:
determining, based on the collaboration attributes of the plurality of other users, a number of documents shared between the user and each of the plurality of other users;
determining, based on the collaboration attributes of the plurality of other users, a recency of each collaboration associated with the documents shared between the user and each of the plurality of other users;
ranking the plurality of other users based on the number of documents shared between the user and each of the plurality of other users, the recency of each collaboration associated with the documents shared between the user and each of the plurality of other users, and one or more rules defining a correlation between the number of documents and the recency; and
selecting one or more other users based on rankings of the plurality of other users, the selected one or more other users representing the predicted one or more collaborators.

8. The method of claim 7, wherein the one or more rules comprise weights associated with the number of documents and the recency.

9. The method of claim 7, further comprising:
determining whether a selection of a collaborator by the user matches any of the predicted one or more collaborators; and
modifying the one or more rules responsive to the selection of the collaborator by the user being different from the predicted one or more collaborators.

10. A method comprising:
identifying, for a first user of a cloud-based content management platform, a plurality of pending actions directed to the first user by a second user of the cloud-based content management platform, wherein the plurality of pending actions by the second user are associated with a subset of a plurality of documents hosted by the cloud-based content management platform;
predicting, by a processor, one or more responses of the first user to the plurality of pending actions associated with the subset of the plurality of documents and directed to the first user by the second user based on one or more action attributes of the plurality of pending actions associated with the subset of the plurality of documents and response history of the first user to a plurality of previous actions of one or more other users including the second user, wherein the plurality of previous actions of the one or more other users are associated with the plurality of documents hosted by the cloud-based content management platform, wherein predicting the one or more responses is based on a trained machine learning model, wherein the trained machine learning model is trained on training data comprising a set of training inputs indicative of action attributes of a plurality of previous actions related to modifications of another plurality of documents and directed to the first user by the other users and a set of target outputs that correspond to respective training inputs in the set of training inputs, the set of target outputs indicative of responses by the first user to the plurality of previous actions related to the modifications of the other plurality of documents and directed to the first user by the other users; and
providing, by the processor, a user interface (UI) for presentation to the first user, the UI comprising one or more UI components to be activated by the first user to provide the predicted one or more responses to at least a subset of the plurality of pending actions associated with the subset of the plurality of documents.

11. The method of claim 10, wherein the plurality of pending actions directed to the first user by the second user comprises one or more of:
one or more invitations, by the second user, to the first user to share respective one or more documents from the subset of the plurality of documents,
one or more comments, by the second user, to the first user in relation to the subset of the plurality of documents, or
one or more edits, by the second user, for the first user with regards to the subset of the plurality of documents.

12. The method of claim 10, wherein the one or more action attributes include at least two or more of:
an action type of a respective action;
a recency of the respective action; or
an identity of a user of the cloud-based content management platform who initiated the respective action.

13. The method of claim 10, further comprising:
determining the response history of the first user to the plurality of previous actions, wherein the response history of the first user to the plurality of previous actions comprises one or more of:
a frequency the first user has responded to a comment by each of the one or more other users;
a ratio of a number of times the first user has edited the plurality of documents for each of the one or more other users to a number of times the first user has commented on the plurality of documents for a respective other user;
a ratio between the first user providing a comment in response to previous actions of the plurality of previous actions of the one or more other users and the first user ignoring previous actions of the plurality of previous actions of the one or more other users;
a ratio between the first user editing a document in response to previous actions of the plurality of previous actions of the one or more other users and the first user ignoring previous actions of the plurality of previous actions of the one or more other users;
a ratio between the first user opening a document in response to previous actions of the plurality of previous actions of the one or more other users and the first user ignoring previous actions of the plurality of previous actions of the one or more other users;
a frequency the first user has commented on the plurality of documents;
a frequency the first user has responded to a comment based on a length of the comment; or
a frequency the first user has edited the plurality of documents.

14. The method of claim 10, wherein the one or more other users either only include the second user, or include the second user and one or more additional users.

15. The method of claim 10, wherein the predicting of the one or more responses of the first user to the plurality of pending actions of the second user comprises:

providing one or more action attributes of each of the plurality of pending actions directed to the first user by the second user with respect to a corresponding document of the subset of documents as an input to the trained machine learning model; and obtaining one or more outputs from the trained machine learning model, the outputs indicating, for each of the plurality of pending actions of the second user, a probability that the first user is to provide a response to a respective pending action.

16. The method of claim 15, further comprising:

providing training data to train the machine learning model on the set of training inputs and the set of target outputs.

17. The method of claim 10, wherein the predicting of the one or more responses of the first user to the plurality of pending actions of the second user comprises:

identifying rules for predicting the one or more responses to pending actions of the second user, the rules comprising a ranking rule and an expected response rule, wherein the ranking rule defines how to rank a pending action based on a correlation between an action type and a recency of the pending action, and the expected response rule defines expected responses to pending actions of different types, the ranking rule and the expected response rule being derived based on the response history of the first user to the plurality of previous actions;

determining an action type and a recency of each of the plurality of pending actions directed to the first user by the second user;

ranking each of the plurality of pending actions directed to the first user by the second user based on the ranking rule and the action type and recency of each of the plurality of pending actions directed to the first user by the second user;

selecting a subset of the plurality of pending actions based on rankings of the plurality of pending actions directed to the first user by the second user; and identifying expected responses to the selected subset of pending actions based on the expected response rule and the type of each pending action, the identified responses representing the predicted one or more responses of the first user to the plurality of pending actions of the second user.

18. The method of claim 17, further comprising:

determining whether the first user has responded as intended to any of the selected subset of pending actions;

modifying the ranking rule responsive to determining that the first user has not responded as intended to any of the selected subset of pending actions determining whether a selection of a response by the first user matches any of the identified responses; and modifying the expected response rule responsive to determining that the selection of the response by the first user does not match any of the identified responses.

19. A system comprising:

a memory; and a processing device, coupled to the memory, to:

identify, for a user of a cloud-based content management platform, a plurality of other users of the cloud-based content management platform that have a relationship with the user and are associated with a plurality of documents hosted by the cloud-based content management platform;

predict one or more collaborators for the user based on collaboration attributes of the plurality of other users, wherein to predict the one or more collaborators the processing device to:

provide a set of collaboration attributes of each of the plurality of other users as input to a trained machine learning model, wherein the input to the trained machine model comprises an indication of a responsiveness of the user to actions of one or more of the plurality of other users that are associated with plurality of documents hosted by the cloud-based content management platform, and obtain one or more outputs from the trained machine learning model, the outputs indicating, for each of the plurality of other users, whether the user is to collaborate with a respective other user, wherein a set of training inputs indicative of collaboration attributes of a plurality of potential collaborators and a set of target outputs that correspond to respective training inputs in the set of training inputs are provided to train the trained machine learning model, the set of target outputs indicative of one or more selections of potential collaborators from the plurality of potential collaborators; and provide for presentation to the user, information identifying the predicted one or more collaborators to direct the user to a subset of documents from the plurality of documents hosted by the cloud-based content management platform, the subset of documents each being associated with one of the predicted one or more collaborators.

20. The system of claim 19, wherein to identify of the plurality of other users of the cloud-based content management platform, the processing device to:

Determine the plurality of other users from at least one or more of:

actions of the user associated with the plurality of documents, a calendar, and a communication tool hosted by the cloud-based content management platform, wherein the actions of the user are from a recent predetermined time period;

affiliations of the user in association with the cloud-based content management platform; or a predetermined number of recently shared documents with the user by the plurality of other users.

* * * * *